United States Patent
Zhang et al.

(10) Patent No.: US 12,470,165 B2
(45) Date of Patent: Nov. 11, 2025

(54) SYSTEMS, APPARATUSES, METHODS, AND COMPUTER PROGRAM PRODUCTS FOR DETECTING UNBALANCE PHASE AND PHASE LOSS FAULT FOR MOTOR CONTROL

(71) Applicant: STMicroelectronics International N.V., Geneva (CH)

(72) Inventors: Yan Zhang, Shanghai (CN); Chengpan Cai, Shenzhen (CN); Dino Costanzo, Catania (IT); Yanjie Sun, Shanghai (CN)

(73) Assignee: STMicroelectronics International N.V., Geneva (CH)

( * ) Notice: Subject to any disclaimer, the term of this patent is extended or adjusted under 35 U.S.C. 154(b) by 171 days.

(21) Appl. No.: 18/526,838

(22) Filed: Dec. 1, 2023

(65) Prior Publication Data

US 2025/0183836 A1    Jun. 5, 2025

(51) Int. Cl.
*H02P 29/024* (2016.01)
*H02P 21/00* (2016.01)
*H02P 21/09* (2016.01)
*H02P 21/22* (2016.01)

(52) U.S. Cl.
CPC ...... *H02P 29/0243* (2016.02); *H02P 21/0003* (2013.01); *H02P 21/09* (2016.02); *H02P 21/22* (2016.02)

(58) Field of Classification Search
CPC .. H02P 29/0243; H02P 21/0003; H02P 21/09; H02P 21/22; H02P 29/024
USPC ................. 318/400.2, 400.01, 700
See application file for complete search history.

(56) References Cited

U.S. PATENT DOCUMENTS

| | | | |
|---|---|---|---|
| 8,867,181 B2 * | 10/2014 | Hasan | H02H 7/00 361/87 |
| 11,146,190 B2 | 10/2021 | Prokop | |
| 2007/0069676 A1 | 3/2007 | MacKay | |
| 2016/0216334 A1 | 7/2016 | Athikessavan et al. | |
| 2020/0169203 A1 | 5/2020 | Park | |
| 2020/0389109 A1 | 12/2020 | Yajurvedi et al. | |
| 2020/0403537 A1 | 12/2020 | Jefferies et al. | |
| 2022/0263446 A1 | 8/2022 | Popov et al. | |

* cited by examiner

Primary Examiner — David Luo
(74) Attorney, Agent, or Firm — Alston & Bird LLP

(57) ABSTRACT

Various examples in accordance with the present disclosure provide systems, apparatuses, methods, and computer program products associated with detecting phase fault in a motor, such as unbalance phase and phase loss fault.

20 Claims, 13 Drawing Sheets

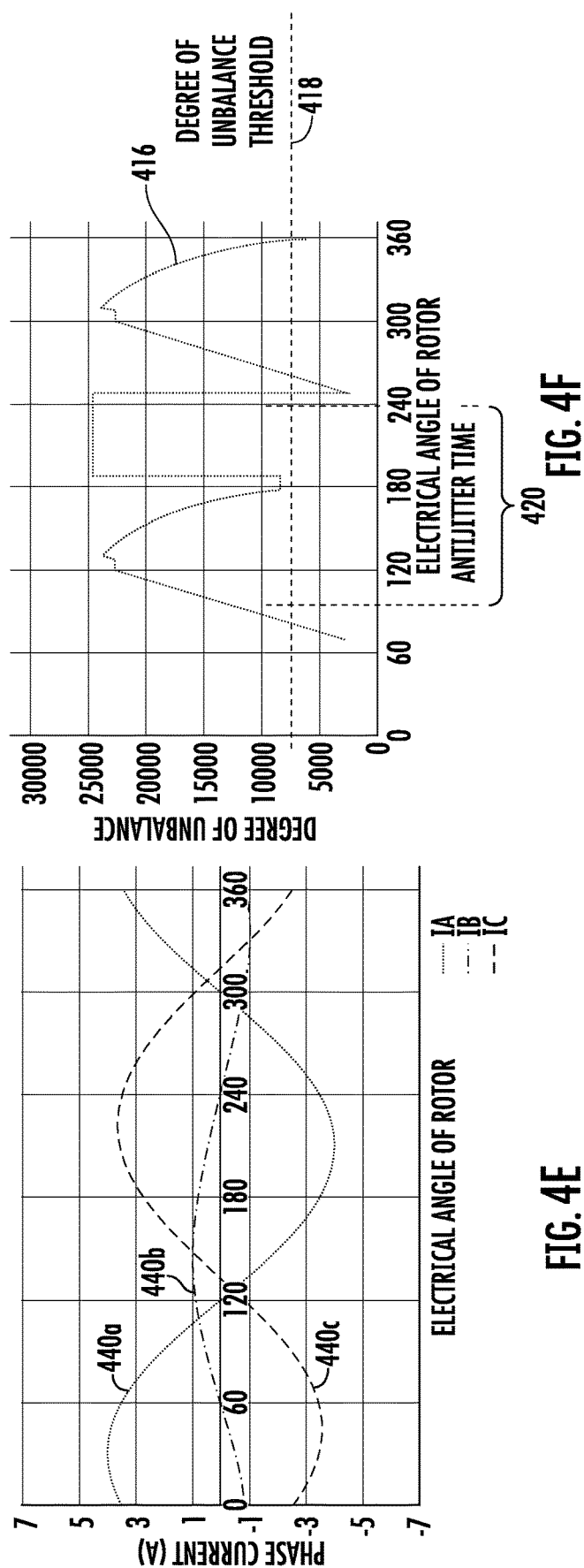

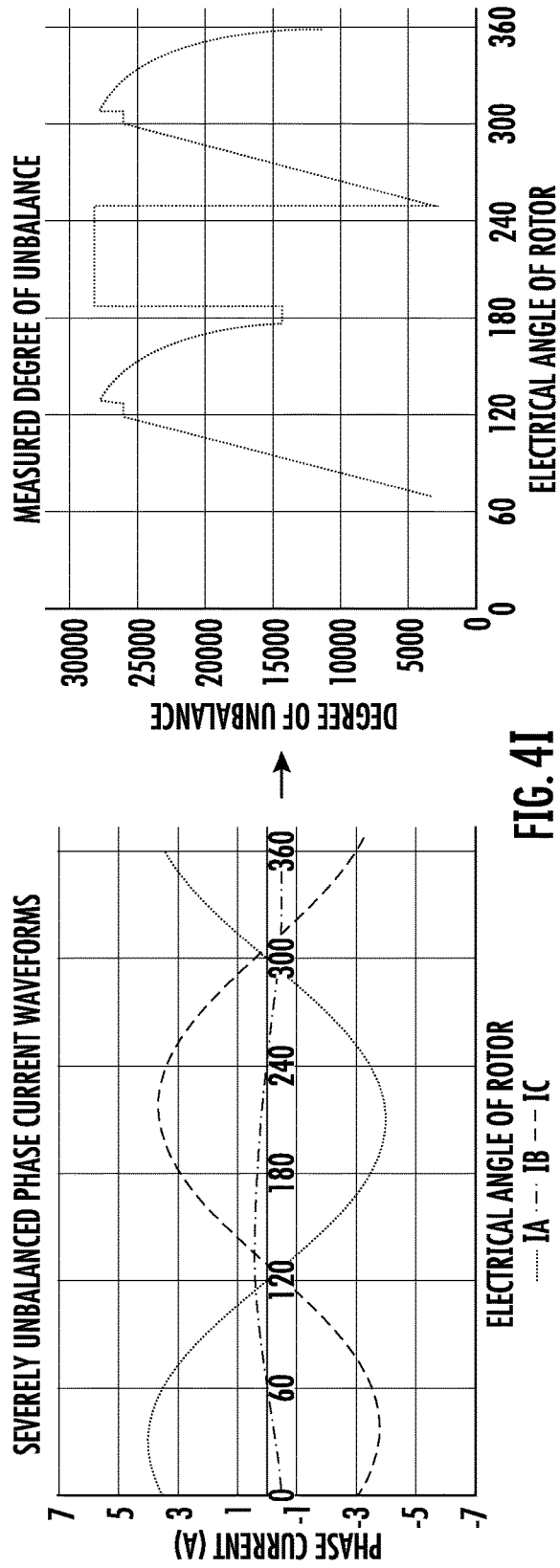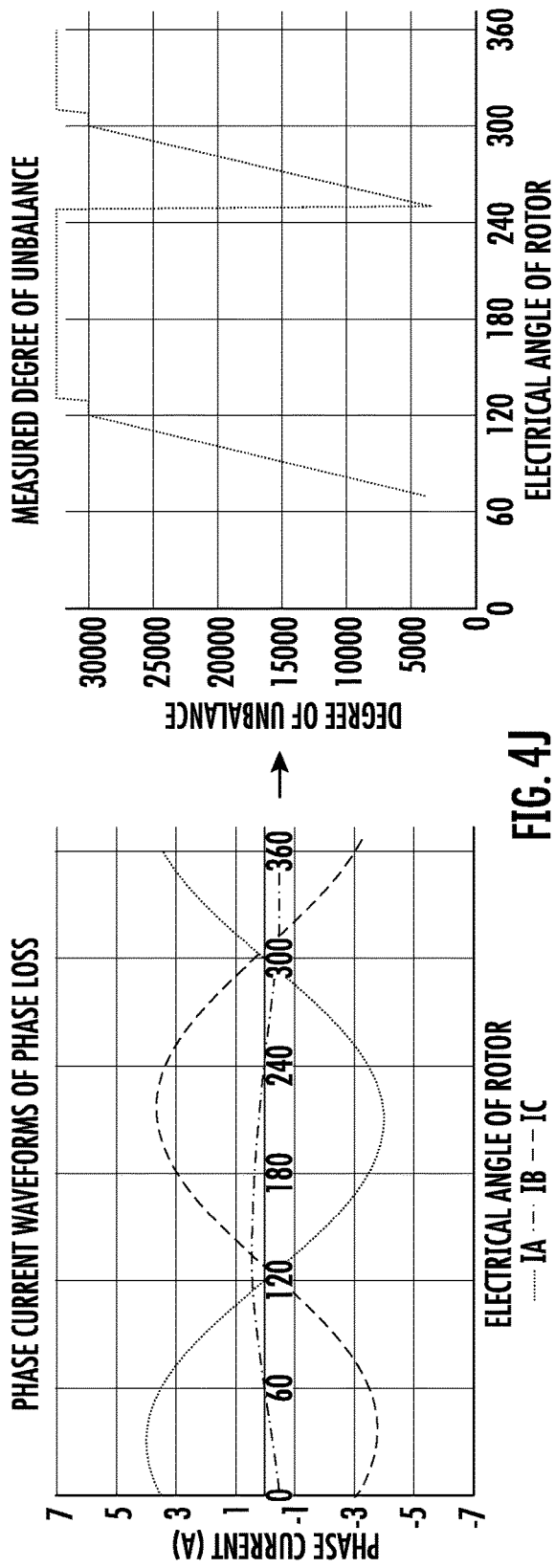
FIG. 4I
FIG. 4J

SYSTEMS, APPARATUSES, METHODS, AND COMPUTER PROGRAM PRODUCTS FOR DETECTING UNBALANCE PHASE AND PHASE LOSS FAULT FOR MOTOR CONTROL

FIELD OF THE INVENTION

Example embodiments of the present disclosure relate generally to motor control and, more particularly, to apparatuses, methods, and systems associated with detecting unbalance phase and phase loss fault associated with a motor.

BACKGROUND

Applicant has identified many technical challenges and difficulties associated with motor control. Through applied effort, ingenuity, and innovation, Applicant has solved many of these identified problems by developing the embodiments of the present disclosure, which are described in detail below.

BRIEF SUMMARY

Various embodiments described herein relate to detecting phase fault associated with a motor such as, for example, unbalance phase and phase loss fault. Other implementations for detecting phase fault associated with a motor will be, or will become, apparent to one with skill in the art upon examination of the following figures and detailed description. It is intended that all such additional implementations be included within this description be within the scope of the disclosure and be protected by the following claims.

In accordance with one aspect of the present disclosure a computer-implemented method for detecting phase fault in a motor comprising a stator and a rotor is provided. In one example, the computer-implemented method includes determining, by one or more processors and based on stator energization vector, a peak phase channel associated with a first sector of a plurality of sectors within which the rotor is located; determining, by the one or more processors, a first peak phase channel current sum value for the first sector, wherein the first peak phase channel current sum value comprises a sum value of consecutive numbers of peak current values associated with the peak phase channel; determining, by the one or more processors, a degree of unbalance associated with the first sector based on comparing the first peak phase channel current sum value for the first sector with a second peak phase channel current sum value associated with a second sector of the plurality of sectors, wherein the first sector comprises a current sector and the second sector comprises a previous sector determined based on a direction of rotation of the rotor; comparing, by the one or more processors, the degree of unbalance with a degree of unbalance threshold to determine whether the degree of unbalance satisfies the degree of unbalance threshold; and updating, by the one or more processors, a phase unbalance occurrence count for the motor based on comparison of the degree of unbalance with the degree of unbalance threshold.

In some embodiments, determining the degree of unbalance associated with the first sector comprises: determining, by the one or more processors, a difference measure for the first sector based on the first peak phase channel current sum value for the first sector and the second peak phase channel current sum value associated with the second sector of the plurality of sectors; and performing a normalization operation on the difference measure to determine the degree of unbalance.

In some embodiments, the example method further comprises determining whether the phase unbalance occurrence count satisfies a predetermined threshold; and initiating the performance of one or more protection actions in response to determining that the phase unbalance occurrence count satisfies the predetermined threshold.

In some embodiments, the example method further comprises determining that the motor is associated with an unbalance phase and/or phase loss fault in response to determining that the phase unbalance occurrence count satisfies the predetermined threshold.

In some embodiments, the motor comprises a three-phase motor.

In some embodiments, the example method further comprises determining the first sector based on stator energization angle.

In some embodiments, the example method further comprises storing the first peak phase channel current sum value in a storage location for comparison with a third peak phase channel current sum value associated with a subsequent sector.

In accordance with a second aspect of the present disclosure, an apparatus for detecting phase fault in a motor comprising a stator and a rotor is provided. In one example, the apparatus comprises at least one processor and at least one non-transitory memory comprising program code stored thereon, wherein the at least one non-transitory memory and the program code are configured to, with the at least one processor, cause the apparatus to at least: determine based on stator energization vector, a peak phase channel associated with a first sector of a plurality of sectors within which the rotor is located; determine a first peak phase channel current sum value for the first sector, wherein the first peak phase channel current sum value comprises a sum value of consecutive numbers of peak current values associated with the peak phase channel; determine a degree of unbalance associated with the first sector based on comparing the first peak phase channel current sum value for the first sector with a second peak phase channel current sum value associated with a second sector of the plurality of sectors, wherein the first sector comprises a current sector and the second sector comprises a previous sector determined based on a direction of rotation of the rotor; compare the degree of unbalance with a degree of unbalance threshold to determine whether the degree of unbalance satisfies the degree of unbalance threshold; and update a phase unbalance occurrence count for the motor based on comparison of the degree of unbalance with the degree of unbalance threshold.

In some embodiments, the at least one non-transitory memory and the program code are configured to, with the at least one processor, cause the apparatus to determine the degree of unbalance associated with the first sector by determining a difference measure for the first sector based on the first peak phase channel current sum value for the first sector and the second peak phase channel current sum value associated with the second sector of the plurality of sectors; and performing a normalization operation on the difference measure to determine the degree of unbalance.

In some embodiments, the at least one non-transitory memory and the program code are configured to, with the at least one processor, further cause the apparatus to at least determine whether the phase unbalance occurrence count satisfies a predetermined threshold; and initiate the performance of one or more protection actions in response to determining that the phase unbalance occurrence count satisfies the predetermined threshold.

In some embodiments, the at least one non-transitory memory and the program code are configured to, with the at least one processor, further cause the apparatus to at least determine that the motor is associated with an unbalance phase and/or phase loss fault in response to determining that the phase unbalance occurrence count satisfies the predetermined threshold.

In some embodiments, the motor comprises a three-phase motor.

In some embodiments, the at least one non-transitory memory and the program code are configured to, with the at least one processor, further cause the apparatus to at least determine the first sector based on stator energization angle.

In some embodiments, the at least one non-transitory memory and the program code are configured to, with the at least one processor, further cause the apparatus to store the first peak phase channel current sum value in a storage location for comparison with a third peak phase channel current sum value associated with a subsequent sector.

In accordance with a second aspect of the present disclosure, a computer program product for detecting phase fault in a motor comprising a stator and a rotor is provided. In one example, the computer program product comprises at least one non-transitory computer-readable storage medium having computer-readable program code portions stored therein, the computer-readable program code portions comprising an executable portion configured to: determine based on stator energization vector, a peak phase channel associated with a first sector of a plurality of sectors within which the rotor is located; determine a first peak phase channel current sum value for the first sector, wherein the first peak phase channel current sum value comprises a sum value of consecutive numbers of peak current values associated with the peak phase channel; determine a degree of unbalance associated with the first sector based on comparing the first peak phase channel current sum value for the first sector with a second peak phase channel current sum value associated with a second sector of the plurality of sectors, wherein the first sector comprises a current sector and the second sector comprises a previous sector determined based on a direction of rotation of the rotor; compare the degree of unbalance with a degree of unbalance threshold to determine whether the degree of unbalance satisfies the degree of unbalance threshold; and update a phase unbalance occurrence count for the motor based on comparison of the degree of unbalance with the degree of unbalance threshold.

In some embodiments, the executable portion is further configured to determine the degree of unbalance associated with the first sector by: determining a difference measure for the first sector based on the first peak phase channel current sum value for the first sector and the second peak phase channel current sum value associated with the second sector of the plurality of sectors; and performing a normalization operation on the difference measure to determine the degree of unbalance.

In some embodiments, the executable portion is further configured to determine whether the phase unbalance occurrence count satisfies a predetermined threshold; and initiate the performance of one or more protection actions in response to determining that the phase unbalance occurrence count satisfies the predetermined threshold.

In some embodiments, the executable portion is further configured to determine that the motor is associated with an unbalance phase and/or phase loss fault in response to determining that the phase unbalance occurrence count satisfies the predetermined threshold.

In some embodiments, the motor comprises a three-phase motor.

In some embodiments, the executable portion is further configured to determine the first sector based on stator energization angle.

The foregoing illustrative summary, as well as other exemplary objectives and/or advantages of the disclosure, and the manner in which the same are accomplished, are further explained in the following detailed description and its accompanying drawings.

BRIEF DESCRIPTION OF THE DRAWINGS

The description of the illustrative embodiments may be read in conjunction with the accompanying figures. It will be appreciated that, for simplicity and clarity of illustration, elements illustrated in the figures have not necessarily been drawn to scale, unless described otherwise. For example, the dimensions of some of the elements may be exaggerated relative to other elements, unless described otherwise. Embodiments incorporating teachings of the present disclosure are shown and described with respect to the figures presented herein, in which:

FIG. 4e illustrates an operational example of an unbalanced phase current waveform that may be associated with a motor in accordance with at least one example embodiment of the present disclosure.

FIG. 4f illustrates an operational example of a graphical representation of a degree of unbalance output of an example phase fault detection system in accordance with at least one example embodiment of the present disclosure.

FIGS. 4g-n illustrate operational examples of varying degrees of phase current waveform and corresponding degree of unbalance output in accordance with at least one example embodiment of the present disclosure.

DETAILED DESCRIPTION OF THE INVENTION

Figure 1:
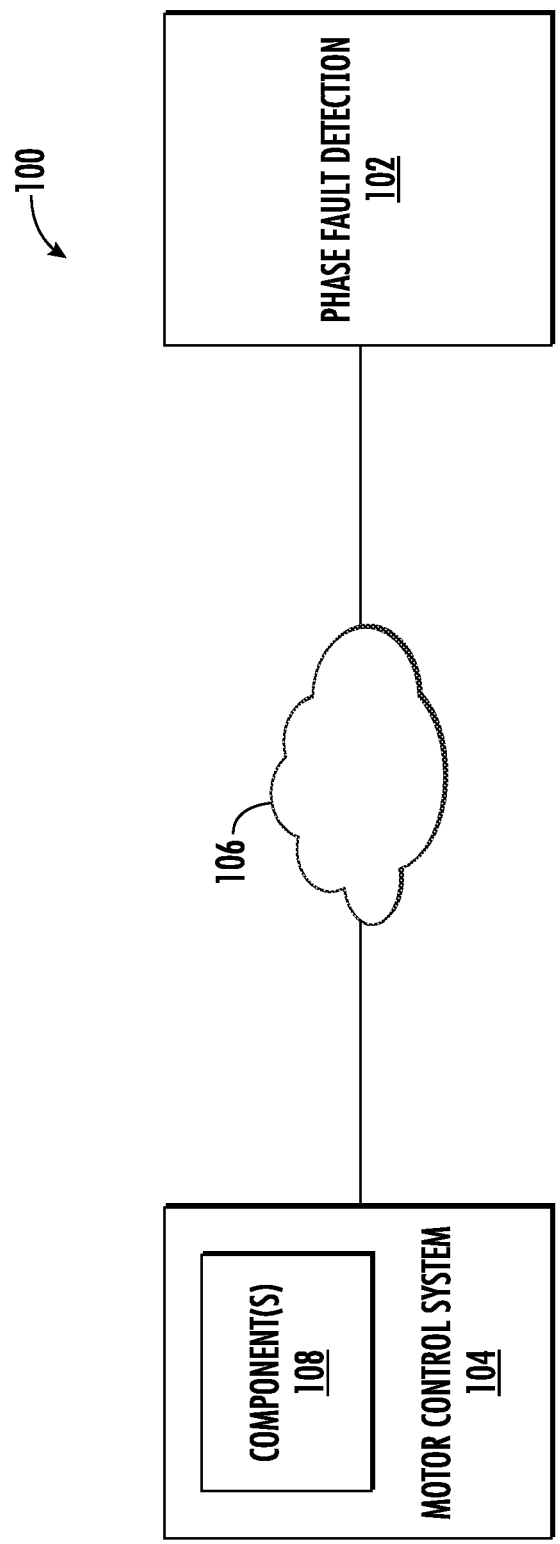
FIG. 1 illustrates a block diagram of an example environment 100 within which embodiments of the present disclosure may operate.

Some embodiments of the present disclosure will now be described more fully hereinafter with reference to the accompanying drawings, in which some, but not all embodiments of the disclosure are shown. Indeed, these disclosures may be embodied in many different forms and should not be construed as limited to the embodiments set forth herein; rather, these embodiments are provided so that this disclosure will satisfy applicable legal requirements. Like numbers refer to like elements throughout.

As used herein, terms such as "front," "rear," "top," etc. are used for explanatory purposes in the examples provided below to describe the relative position of certain components or portions of components. Furthermore, as would be evident to one of ordinary skill in the art in light of the present disclosure, the terms "substantially" and "approximately" indicate that the referenced element or associated description is accurate to within applicable engineering tolerances.

As used herein, the term "comprising" means including but not limited to and should be interpreted in the manner it is typically used in the patent context. Use of broader terms such as comprises, includes, and having should be understood to provide support for narrower terms such as consisting of, consisting essentially of, and comprised substantially of.

The phrases "in one embodiment," "according to one embodiment," and the like generally mean that the particular feature, structure, or characteristic following the phrase may be included in at least one embodiment of the present disclosure, and may be included in more than one embodiment of the present disclosure (importantly, such phrases do not necessarily refer to the same embodiment).

The word "example" or "exemplary" is used herein to mean "serving as an example, instance, or illustration." Any implementation described herein as "exemplary" is not necessarily to be construed as preferred or advantageous over other implementations.

If the specification states a component or feature "may," "can," "could," "should," "would," "preferably," "possibly," "typically," "optionally," "for example," "often," or "might" (or other such language) be included or have a characteristic, that a specific component or feature is not required to be included or to have the characteristic. Such a component or feature may be optionally included in some embodiments, or it may be excluded.

As used herein, the term "or" is used in both the alternative and conjunctive sense, unless otherwise indicated. The terms "illustrative" and "example" are used to be examples with no indication of quality level. Terms such as "computing," "determining," "generating," and/or similar words are used herein interchangeably to refer to the creation, modification, or identification of data. Further, "based on," "based on in part on," "based at least on," "based upon," and/or similar words are used herein interchangeably in an open-ended manner such that they do not indicate being based only on or based solely on the referenced element or elements unless so indicated. Like numbers refer to like elements throughout.

In a motor with three phase winding (e.g., permanent magnet synchronous motor (PMSM), AC induction motor (ACIM), brushless DC motors (BLDC), etc.), the unbalance of phase current—caused by, for example, phase loss; short circuit; loose wire; and/or the like—decreases the output torque of the motor; increases the current in the stator windings (e.g., relative to normal operation); and increases the copper consumption and iron consumption. These in turn results in increased motor temperature which ultimately burns the stator windings.

Embodiments of the present disclosure address the above-mentioned challenges and difficulties, as well as other challenges and difficulties associated with motor control. Example embodiments of the present disclosure provide a phase fault detection system configured to efficiently and reliably detect at least unbalance phase and phase loss associated with a motor. For example, example embodiments of the present disclosure are configured to detect and timely protect a motor when improper selection of fuse or bad pressing occurs (e.g., such that the fuse breaks a phase of the motor). As another example, example embodiments of the present disclosure are configured to detect and timely protect a motor when a wire connector is loose and/or a wire of a winding breaks. As yet another example, example embodiments of the present disclosure may be configured to detect and timely protect a motor when a phase winding is open. As a further example, example embodiments of the present disclosure may be configured to detect and timely protect a motor when there is a short-circuit between phases, turns and/or ground, including conditions where the motor phase cable is not broken to an extent that it is disconnected, the insurance from the DC bus is not fused, and the three-phase current of motor is unbalanced.

Some embodiments of the present disclosure determine peak phase channel associated with the sector in which a rotor of the motor in located based on stator energization vector, determine a peak phase channel current sum value for the sector, and determine a difference measure for the sector by comparing with a previous sector in which the rotor of the motor was located (e.g., immediately preceding rotor sector). Some embodiments determine the degree of unbalance (e.g., unbalance measurement) based on the difference measure and/or a normalization operation. Some embodiments, trigger or otherwise initiate one or more protection actions (e.g., decreasing the speed of the motor, causing a microcontroller associated with the motor to stop the motor, and/or the like) to mitigate damage in response to a degree of unbalance that satisfies one or more criteria.

Embodiments of the present disclosure provide several technical advantages. For example, embodiments of the present disclosure are configured to determine the peak phase channel (also referred to herein as peak phase current channel) for unbalance analysis, regardless of the status of the motor—e.g., whether the motor is in normal running status or in start process of sensorless open-loop mode. As another example, by performing a normalization operation to determine the degree of unbalance associated with a sector, embodiments of the present disclosure perform effectively both on rated power state and no-load state, which obviates the need to set different threshold for fault triggering according to different peak phase current in the driving system (e.g., motor control system). For instance, example embodiments of the present disclosure are configured to work in both load working condition (e.g., rated power working condition) and no-load working condition (e.g., 0.5 A peak, and/or the like), where the same performance can be shown for the rated power working condition and no-load working condition regardless of the current level. As yet another example, in addition to being able to detect phase loss fault associated with a motor, example embodiments of the present disclosure can precisely detect the extent of imbalance that exist in the driving system/motor control system and facilitate implementation of appropriate measures. As yet further example, embodiments of the present disclosure provide for strong anti-interference ability for fault judgement, including ripples on the phase current sampling. For example, some embodiments initiate the performance of one or more protection actions based on the number of consecutive degree of unbalance measurement that satisfies a predetermined threshold (e.g., anti-jitter time threshold).

FIG. 1 illustrates a block diagram of an example environment 100 within which embodiments of the present disclosure may operate. Specifically FIG. 1 illustrates an example, phase fault detection system 102 and one or more components 108 associated a motor control system 104. The phase fault detection system 102 and the one or more components 108 may communicate with each other over one or more communications network(s), for example a communications network 106.

It should be appreciated that the communications network 106 in some embodiments is embodied in any of a myriad of network configurations. In some embodiments, the communications network 106 embodies a public network (e.g., the Internet). In some embodiments, the communications network 106 embodies a private network (e.g., an internal localized, or closed-off network between particular devices). In some other embodiments, the communications network 106 embodies a hybrid network (e.g., a network enabling internal communications between particular connected devices and external communications with other devices). The communications network 106 in some embodiments includes one or more base station(s), relay(s), router(s), switch(es), cell tower(s), communications cable(s) and/or associated routing station(s), and/or the like. In some embodiments, the communications network 106 includes one or more user-controlled computing device(s) (e.g., a user owned router and/or modem) and/or one or more external utility devices (e.g., Internet service provider communication tower(s) and/or other device(s)).

Each of the components of the environment 100 communicatively coupled to transmit data to and/or receive data from one another over the same or different wireless and/or wired networks embodying the communications network 106. Such configuration(s) include, without limitation, a wired or wireless Personal Area Network (PAN), Local Area Network (LAN), Metropolitan Area Network (MAN), Wide Area Network (WAN), and/or the like. Additionally, while FIG. 1 illustrate certain system entities as separate, stand-alone entities communicating over the communications network 106, the various embodiments are not limited to this architecture. In other embodiments, one or more computing entities share one or more components, hardware, and/or the like, or otherwise are embodied by a single computing device such that connection(s) between the computing entities over the communications network 106 are altered and/or rendered unnecessary. For example, in some embodiments, the one or more components 108 includes some or all of the phase fault detection system 102, such that an external communications network 106 is not required.

In some embodiments, the phase fault detection system 102 and the one or more components 108 are embodied in the motor control system 104. In such some embodiments, the phase fault detection system 102 and the one or more components 108 may be communicatively coupled via at least one wired connection. Alternatively or additionally, in some embodiments, the one or more components 108 includes the phase fault detection system 102, for example, as a software component.

In some embodiments, the phase fault detection system 102 is configured to detect at least unbalance phase and phase loss fault in a three-phase motor such as, for example, a PMSM, ACIM, BLDC, and/or the like. A PMSM, for example, may comprise three phase windings in the stator and permanent magnets in the rotor. The PMSM may be controlled using one or more techniques. For example, the PMSM may be controlled using vector control technique (e.g., field-oriented control (FOC) technique, direct torque control (DTC), and/or the like). As another example, the PMSM may be controlled using scalar control technique.

Figure 2A:
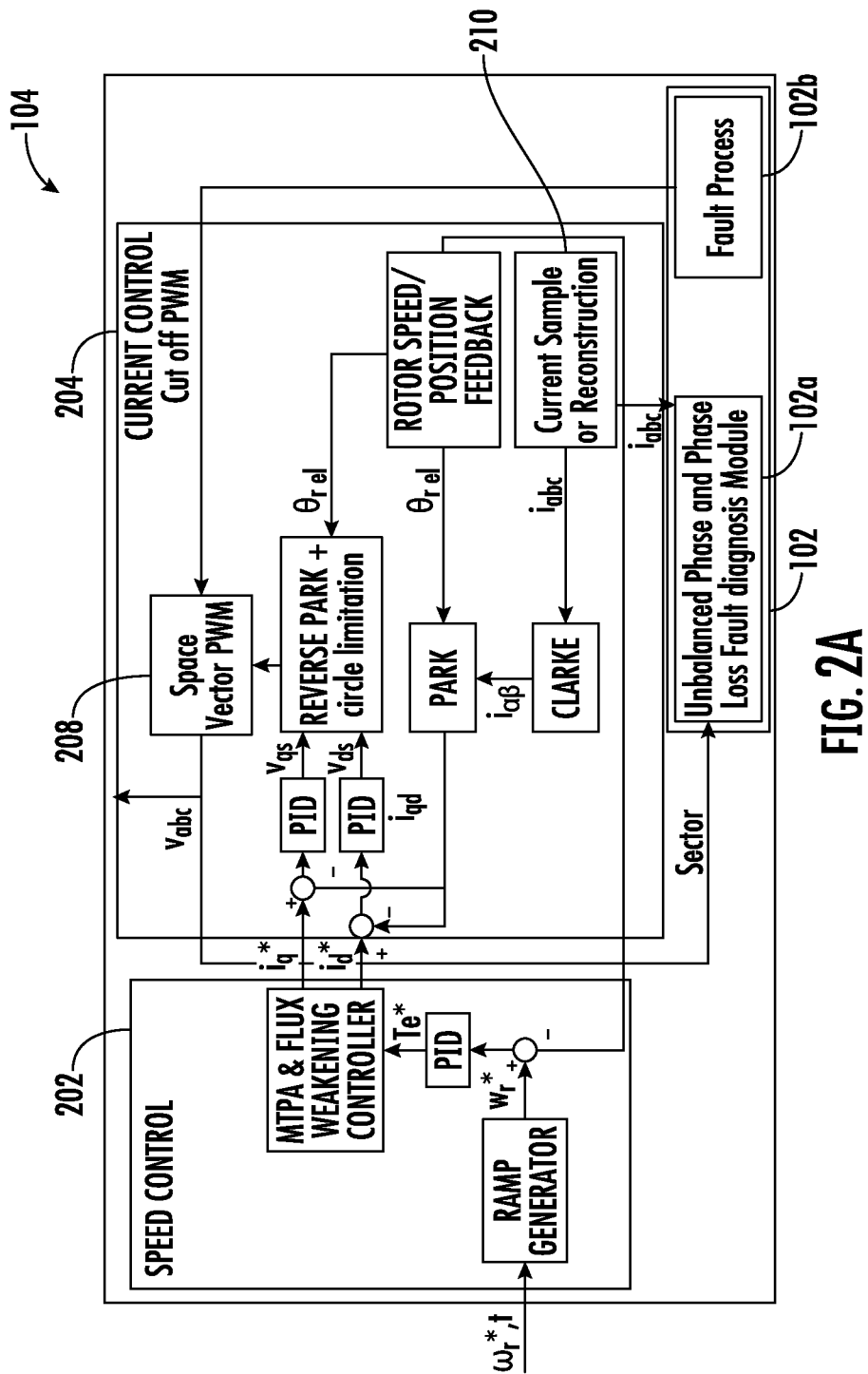
FIG. 2a illustrates an example motor control system within which a phase fault detection system in accordance with at least one example embodiment of the present disclosure may be utilized.

FIG. 2a illustrates a block diagram of an example motor control system 104 within which a phase fault detection system in accordance with at least one example embodiment of the present disclosure may be utilized. Specifically, FIG. 2a illustrates a PMSM driving system with an embodying an example phase fault detection system in accordance with at least one example embodiment of the present disclosure. As shown in FIG. 2a, the PMSM driving system includes a speed control system 202, a current control system 204, and a phase fault detection system 102. The phase fault detection system 102 may comprise an unbalance phase and phase loss fault diagnosis module 102a and a fault process module 102b. The current control system 204 includes a space vector pulse width modulation (SVPWM) module 208 and a current sample/reconstruction module 210.

As described above, a three-phase motor may include three phases, where each phase includes a motor winding. In some examples, a three-phase motor may be powered, controlled, or otherwise driven based on SVPWM scheme/technique. For example, the SVPWM module 208 may be configured to implement a SVPWM scheme/technique to drive the PMSM. In some examples the SVPWM module is configured to perform SVPWM based on a 3-phase voltage such that the PMSM is controlled based on the switching of space voltage vectors that define six sectors. For example, a full cycle (e.g., one electrical period) of the SVPWM may be divided into a six sectors (e.g., 60° per sector). In some examples, the SVPWM module is configured to apply three corresponding voltage signals to the three phases (e.g., in response to three corresponding drive control signals). For example, a controller associated with the motor control system (e.g., sensorless motor control, sensor motor control, and/or the like) may provide sinusoidal voltage to the stator winding of the motor (e.g., based on SVPWM scheme/technique). The controller may control the sinusoidal voltage provided to the stator winding, where different voltage levels are provided to the different phases according to the rotor position (e.g., corresponding to the sector within which the rotor is located). For example, a sensor and/or sensorless observer may be configured to provide the data/information about the rotor, so that different voltage levels may be provided to the stator winding according to the different positions of the rotor. The current sample/reconstruction module 210 may be configured to sense, measure, or otherwise determine phase current associated with the three phases of the motor.

In some examples, the SVPWM module 208 may be configured to provide data, signal, and/or the like to the phase fault detection system 102 (e.g., the unbalance phase and phase loss fault diagnosis module 102a thereof) that comprises or otherwise describes the current sector of the six sectors within which the rotor is located. In some examples, the current sample/reconstruction module 210 may be configured to provide data, signal, and/or the like to the phase fault detection system 102 (e.g., the unbalance phase and phase loss fault diagnosis module 102a thereof) that comprises or otherwise the phase current associated with the three phases of the motor. For example, the phase fault detection system 102 may be configured to receive current sector information and matching phase current values for each of the three phases. The phase fault detection system 102 (e.g., the unbalance phase and phase loss fault diagnosis module 102a thereof) may leverage the current sector information and phase current values to determine if the motor is associated with a fault. As shown in FIG. 2a, output of the unbalance phase and phase loss fault diagnosis module 102a of the phase fault detection system 102 may be provided to the fault process module 102b of the phase fault detection system 102.

Figure 2C:
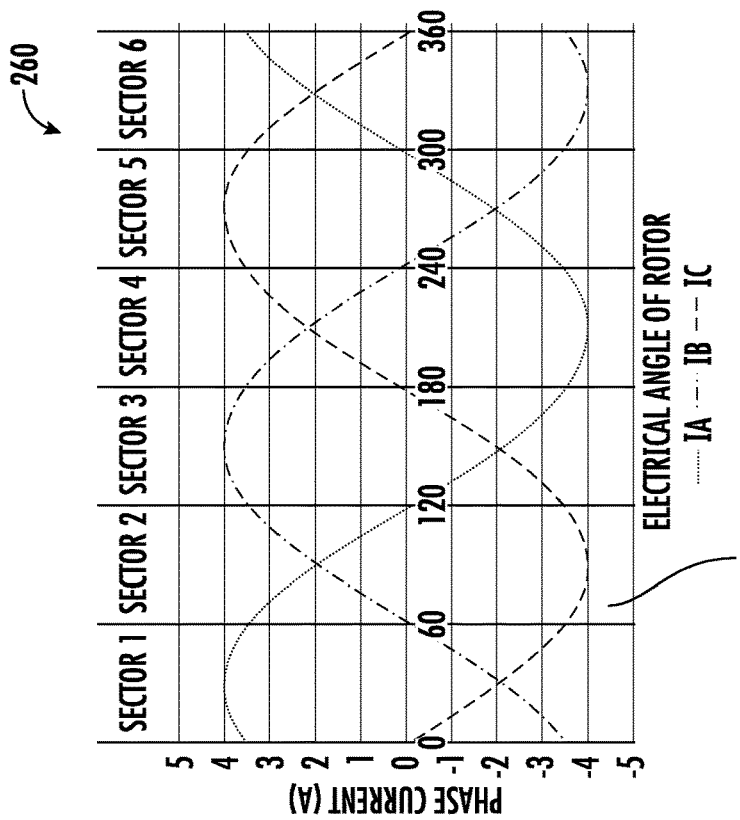
FIG. 2c illustrates an example phase current waveform in accordance with at least one example embodiment of the present disclosure.
Figure 2B:
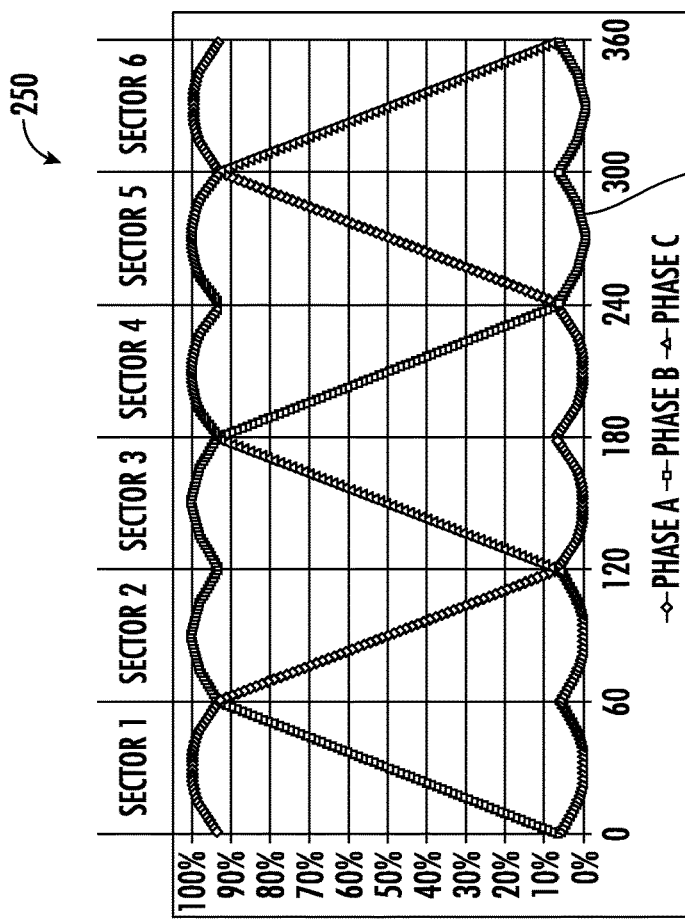
FIG. 2b illustrates an example SVPWM phase voltage waveform in accordance with at least one example embodiment of the present disclosure.

FIG. 2b illustrates an example SVPWM phase voltage waveform 250 in accordance with at least one example embodiment of the present disclosure and FIG. 2c illustrates an example phase current waveform 260 in accordance with at least one example embodiment of the present disclosure. Specifically, FIG. 2c illustrates an example phase current waveform corresponding to the SVPWM phase voltage illustrated in FIG. 2b. In some examples, for each space vector modulation sector there may be two phases approximately maintaining the same value of duty cycle while the remaining one has a large duty cycle variation. The corresponding phase current 262 depicted in FIG. 2c may be the accumulated products of phase voltage 252 in different sectors in each phase, where the phase current may have some phase lag relative to the voltage.

In some embodiments, as discussed herein, the phase fault detection system 102 determines a peak phase channel (e.g., phase current channel in peak state in different sectors) based on the current stator energization vector. For example, the phase fault detection system 102 may be configured to select corresponding current waveforms to extract peak phase current according to different positions of stator energization sector. The phase fault detection system 102 may be configured to determine for a given sector which phase current is the peak state and ignore the other phase currents, where the peak is proportional to the load of the motor.

While the description above provides an example PMSM driving system for a three-phase motor, it is noted that the scope of the present disclosure is not limited to the description above. Example embodiments of the present disclosure may be implemented in other driving systems, and/or other motor configurations. For example, while the description herein is made with reference to three-phase motor, it will be understood that the techniques disclose herein are more generally applicable to multi-phase motors.

The phase fault detection system 102 may be configured for detecting at least unbalance phase and phase loss fault associated with a motor. The phase fault detection system 102 includes one or more computing device(s), system(s), and/or the like embodied in hardware, software, firmware, and/or a combination thereof, configured to facilitate and/or perform various functionalities associated with detecting phase fault associated with a motor, including unbalance phase and phase loss fault. The phase fault detection system 102 may include one or more computing device(s), system (s), and/or the like embodied in hardware, software, firmware, and/or a combination thereof, configured to initiate one or more protection actions in response to detecting a phase fault that satisfies a predefined threshold (e.g., degree of unbalance threshold).

In some embodiments, the phase fault detection system 102 may include one or more specially configured application server(s), database server(s), end user device(s), cloud computing system(s), and/or the like. Additionally or alternatively, in some embodiments, the phase fault detection system 102 may include one or more user device(s) that enables access to functionality provided by the phase fault detection system 102, for example via a web application, native application, and/or the like.

Figure 3:
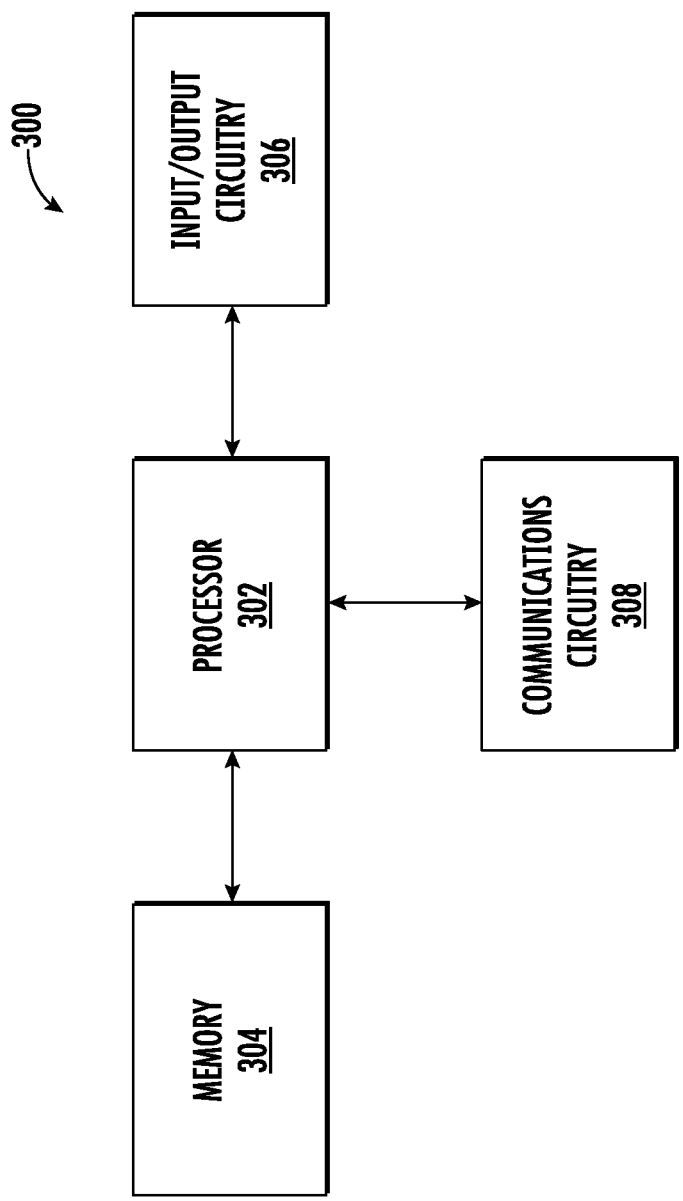
FIG. 3 illustrates a block diagram of an example apparatus that may be specially configured in accordance with at least one example embodiment of the present disclosure.

FIG. 3 illustrates a block diagram of an example apparatus that may be specially configured in accordance with at least one example embodiment of the present disclosure. Specifically, FIG. 3 depicts an example unbalance phase and phase loss fault detection apparatus ("apparatus 300") specially configured in accordance with at least some example embodiments of the present disclosure. In some embodiments, the phase fault detection system 102 and/or a portion thereof is embodied by one or more system(s), such as apparatus 300 as depicted and describe in FIG. 3. The apparatus 300 includes processor 302, memory 304, input/output circuitry 306, and/or communications circuitry 308. In some embodiments, the apparatus 300 is configured, using one or more of the sets of circuitry embodied by processor 302, memory 304, input/output circuitry 306, and/or communications circuitry 308, to execute and perform the operations described herein.

In general, the terms computing entity (or "entity" in reference other than to a user), device, system, and/or similar words used herein interchangeably may refer to, for example, one or more computers, computing entities, desktop computers, mobile phones, tablets, phablets, notebooks, laptops, distributed systems, items/devices, terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably. In this regard, the apparatus 300 embodies a particular specially-configured computing entity transformed to enable the specific operations described herein and provide the specific advantages associated therewith, as described herein.

Although components are described with respect to functional limitations, it should be understood that the particular implementations necessarily include the use of particular computing hardware. It should also be understood that in some embodiments certain of the components described herein include similar or common hardware. For example, in some embodiments two sets of circuitry both leverage use of the same processor(s), network interface(s), storage medium (s), and/or the like, to perform their associated functions, such that duplicate hardware is not required for each set of circuitry. The use of the term "circuitry" as used herein with respect to components of the apparatuses described herein should therefore be understood to include particular hardware configured to perform the functions associated with the particular circuitry as described herein.

Particularly, the term "circuitry" should be understood broadly to include hardware and, in some embodiments, software for configuring the hardware. For example, in some embodiments, "circuitry" includes processing circuitry, storage media, network interfaces, input/output devices, and/or the like. Alternatively or additionally, in some embodiments, other elements of the apparatus 300 provide or supplement the functionality of another particular set of circuitry. For example, the processor 302 in some embodiments provides processing functionality to any of the sets of circuitry, the memory 304 provides storage functionality to any of the sets of circuitry, the communications circuitry 308 provides network interface functionality to any of the sets of circuitry, and/or the like.

In some embodiments, the processor 302 (and/or co-processor or any other processing circuitry assisting or otherwise associated with the processor) is/are in communication with the memory 304 via a bus for passing information among components of the apparatus 300. In some embodiments, for example, the memory 304 is non-transitory and may include, for example, one or more volatile and/or non-volatile memories. In other words, for example, the memory 304 in some embodiments includes or embodies an electronic storage device (e.g., a computer readable storage medium). In some embodiments, the memory 304 is configured to store information, data, content, applications, instructions, or the like, for enabling the apparatus 300 to carry out various functions in accordance with example embodiments of the present disclosure.

The processor 302 may be embodied in a number of different ways. For example, in some example embodiments, the processor 302 includes one or more processing devices configured to perform independently. Additionally or alternatively, in some embodiments, the processor 302 includes one or more processor(s) configured in tandem via a bus to enable independent execution of instructions, pipelining, and/or multithreading. The use of the terms "processor" and "processing circuitry" should be understood to include a single core processor, a multi-core processor, multiple processors internal to the apparatus 300, and/or one or more remote or "cloud" processor(s) external to the apparatus 300.

In an example embodiment, the processor 302 is configured to execute instructions stored in the memory 304 or otherwise accessible to the processor. Alternatively or additionally, the processor 302 in some embodiments is configured to execute hard-coded functionality. As such, whether configured by hardware or software methods, or by a combination thereof, the processor 302 represents an entity (e.g., physically embodied in circuitry) capable of performing operations according to an embodiment of the present disclosure while configured accordingly. Alternatively or additionally, as another example in some example embodiments, when the processor 302 is embodied as an executor of software instructions, the instructions specifically configure the processor 302 to perform the algorithms embodied in the specific operations described herein when such instructions are executed.

As one particular example embodiment, the processor 302 is configured to perform various operations associated with phase fault detection in a motor and/or initiating the performance of one or more protection actions. In some such embodiments, the processor 302 includes hardware, software, firmware, and/or a combination thereof that receives sector information (e.g., current sector) and/or phase current information (e.g., phase current measurements associated with the three phases of the motor). Additionally or alternatively, in some embodiments, the processor 302 includes hardware, software, firmware, and/or a combination thereof that performs one or more calculation operations to determine the degree of unbalance on a phase current. Additionally or alternatively, in some embodiments, the processor 302 includes hardware software, firmware, and/or a combination thereof that determines if the degree of unbalance associated with a portion of one full cycle (e.g., an electrical period) satisfies a predetermined threshold (e.g., anti-jitter time threshold). Additionally or alternatively, the processor 302 includes hardware software, firmware, and/or a combination thereof that initiates the performance of one or more protection actions based on the degree of unbalance associated with an electrical period associated with a motor.

In some embodiments, the apparatus 300 includes communications circuitry 308. The communications circuitry 308 includes any means such as a device or circuitry embodied in either hardware or a combination of hardware and software that is configured to receive and/or transmit data from/to a network and/or any other device, circuitry, or module in communication with the apparatus 300. In this regard, in some embodiments the communications circuitry 308 includes, for example, a network interface for enabling communications with a wired or wireless communications network. Additionally or alternatively in some embodiments, the communications circuitry 308 includes one or more network interface card(s), antenna(s), bus(es), switch(es), router(s), modem(s), and supporting hardware, firmware, and/or software, or any other device suitable for enabling communications via one or more communications network(s). Additionally or alternatively, the communications circuitry 308 includes circuitry for interacting with the antenna(s) and/or other hardware or software to cause transmission of signals via the antenna(s) or to handle receipt of signals received via the antenna(s). In some embodiments, the communications circuitry 308 enables transmission to and/or receipt of data from user device, one or more asset(s) or accompanying sensor(s), and/or other component in communication with the apparatus 300.

Additionally or alternatively, in some embodiments, two or more of the sets of circuitries embodying processor 302, memory 304, input/output circuitry 306, communications, and/or circuitry 308 are combinable. Alternatively or additionally, in some embodiments, one or more of the sets of circuitry perform some or all of the functionality described associated with another component. For example, in some embodiments, two or more of the sets of circuitry embodied by processor 302, memory 304, input/output circuitry 306, and/or communications circuitry 308 are combined into a single module embodied in hardware, software, firmware, and/or a combination thereof.

Example Data Environments and Architectures of the Disclosure

Having described example systems and apparatuses of the disclosure, example data architectures, data environments, and data flows will now be described. In some embodiments, the data architectures represent data object(s) maintained and processed in particular computing environments. In some embodiments, the computing environment(s) is/are maintained via hardware, software, firmware, and/or a combination thereof, that execute one or more software application(s) that manage such data. For example, in some embodiments, the apparatus 300 execute one or more software application(s) that maintain the data architecture(s) as depicted and described to, alone or in conjunction with one another, perform the functionality as depicted and described with respect to detecting unbalance phase and phase loss fault associated with a motor and/or initiating the performance of one or more actions in response to detecting an unbalance phase and/or phase loss fault.

Figure 4A:
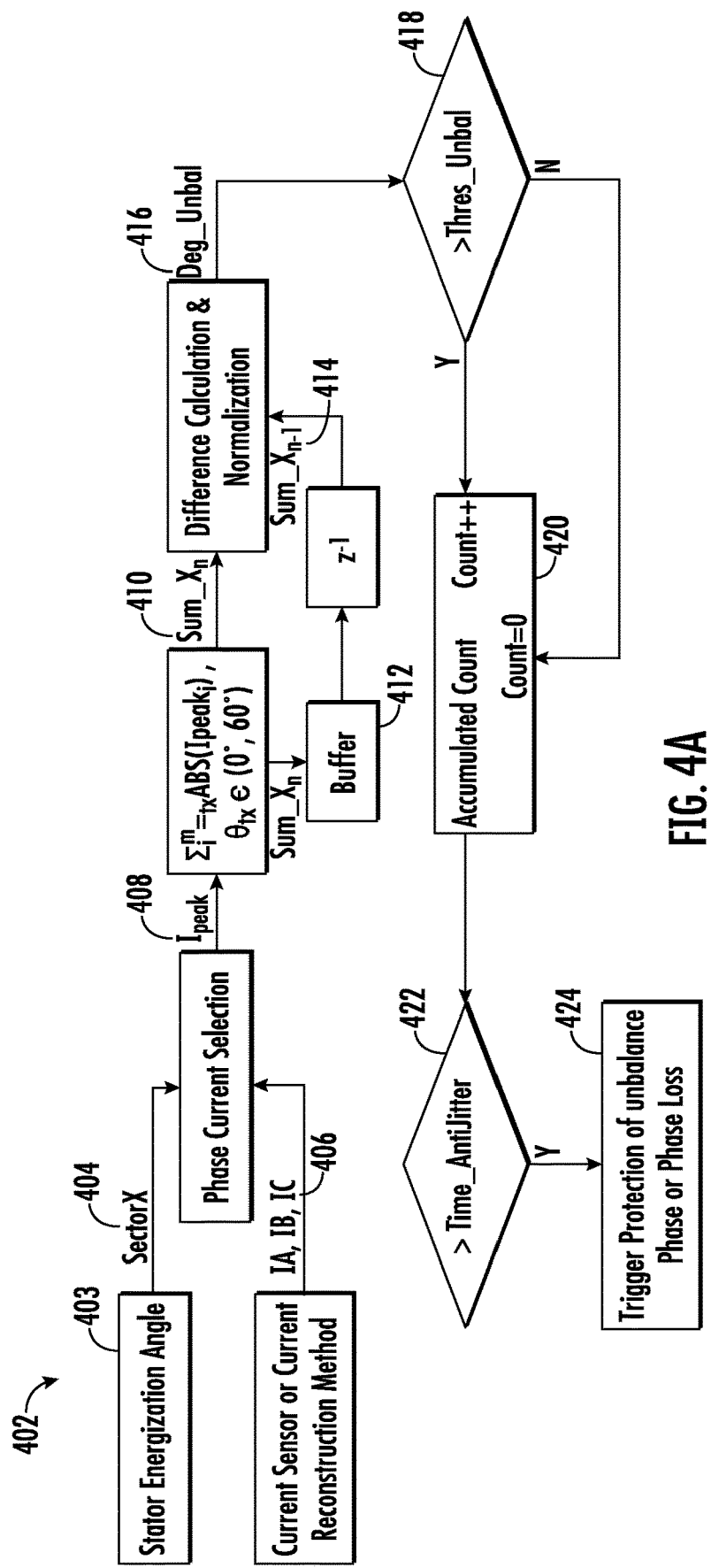
FIG. 4a illustrates a visualization of an example data environment for detecting phase fault in accordance with at least one example embodiment of the present disclosure.

FIG. 4a illustrates a visualization of an example data environment for detecting phase fault in accordance with at least one example embodiment of the present disclosure. Specifically FIG. 4a illustrates a visualization of an example data environment for detecting unbalance phase and phase loss fault in accordance with at least one example embodiment of the present disclosure. Specifically, the data environment for detecting phase loss and phase loss fault is performed by a phase fault detection system 402. The phase fault detection system 402 may embody a particular implementation of the phase fault detection system 102 as depicted and described herein. For example, in some embodiments, the phase fault detection system 402 is embodied by the apparatus 300 as depicted and described herein. In some embodiments, the phase fault detection system 402 causes rendering of, or otherwise provides access to, one or more user interface specially configured to enable inputting of data.

As illustrated in FIG. 4a, the phase fault detection system 402 determines the peak phase channel 408 with respect to a current sector. A peak phase channel may describe the phase current channel of a plurality of phase current channels that is in a peak state for a given sector of a plurality of sectors. The plurality of sectors, for example, may comprise the six sectors within which a rotor of the motor may be located. In this regard, a current sector may describe the sector in which the rotor is located at a particular time (e.g., current time). Each phase current channel may be associated with a particular phase of the three-phase motor. For example, a first phase current channel may be associated with a first phase of the three-phase motor, a second phase current channel may be associated with a second phase of the three-phase motor, and a third phase current channel may be associated with a third phase of the three-phase motor. As described above, a phase current waveform associated with a three-phase motor controlled using a SVPWM scheme may be divided into six sectors, where the phase current may correspond to the accumulated products of phase voltage in different sectors in each phase.

Figure 4B:
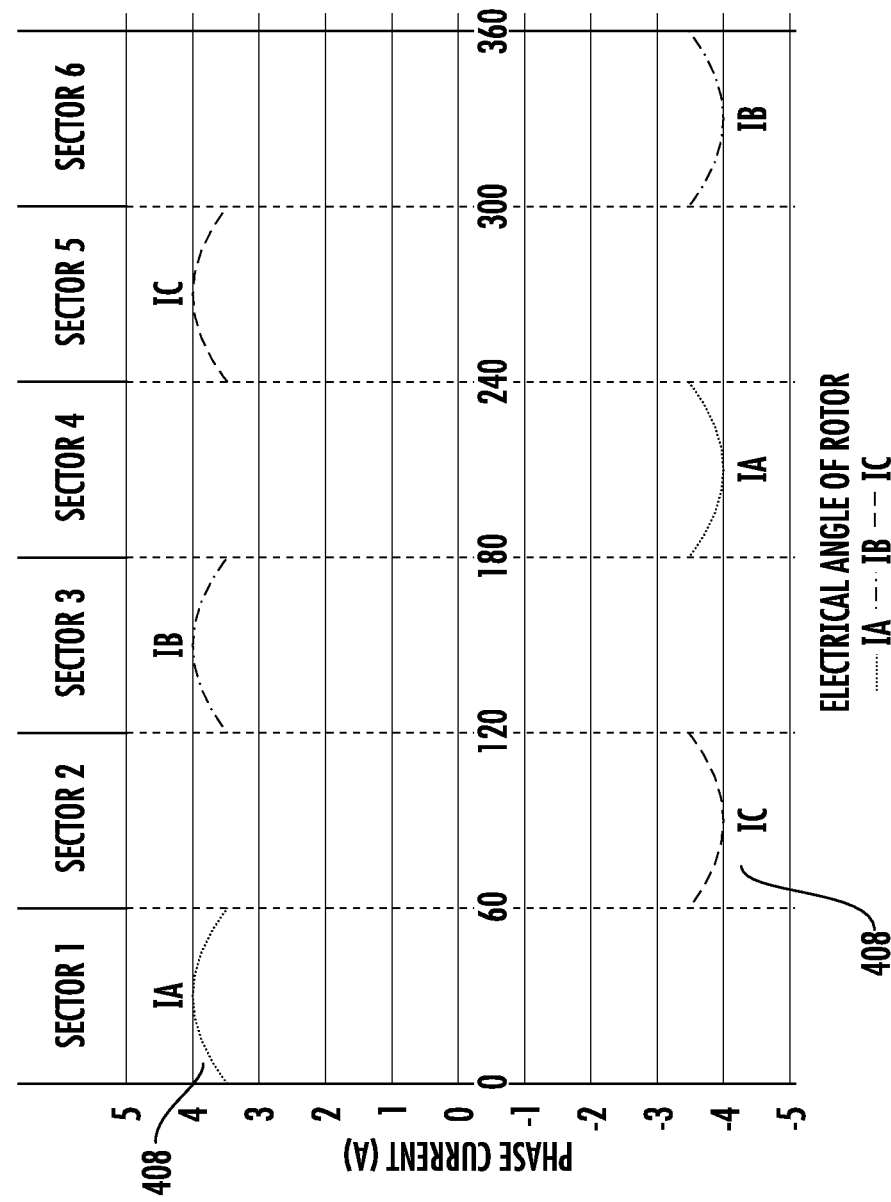
FIG. 4b illustrates an operations example of a portion of an example balanced phase current waveform associated with an example motor control system within which a phase fault detection system in accordance with at least one example embodiment of the present disclosure is utilized.

FIG. 4b illustrates a portion of an example balanced phase current waveform associated with an example motor control system within which a phase fault detection system according to at least one example embodiment of the present disclosure is utilized. Specifically, FIG. 4b illustrates the peak states of a balanced phase current waveform. As shown in FIG. 4b, each sector may comprise a particular phase current channel that is in a peak state. As shown in FIG. 4b, the peak phase channel 408 for the first sector (e.g. sector 1) corresponds to a first phase of the three-phase motor, the peak phase channel 408 for the second sector (e.g., sector 2) corresponds to a second phase of the three-phase motor, the peak phase channel 408 for the third sector (e.g., sector 3) corresponds to a third phase of the three-phase motor, the peak phase channel 408 for the fourth sector (e.g., sector 4) corresponds to a first phase of the three-phase motor, the peak phase channel 408 for the fifth sector (e.g., sector 5) corresponds to a fifth phase of the three-phase motor, and the peak phase channel 408 for the sixth sector (e.g., sector 6) corresponds to a sixth phase of the three-phase motor.

With reference to FIG. 4a, in some embodiments, the phase fault detection system 402 determines the peak phase channel 408 for the current sector based on the sector information 404 (e.g., depicted Sector X in FIG. 4a) and the phase current 406 associated with each of the three phases of the motor (e.g., depicted IA, IB, IC in FIG. 4a, where "IA" is the phase current associated with a first phase of the three-phase motor, "IB" is the phase current associated with a second phase of the three-phase motor, and "IC" is the phase current associated with a third phase of the three-phase motor).

In some embodiments, the phase fault detection system 402 receives data that describes the current sector and phase current values associated with the three phases. The phase current values may comprise matching phase current values with respect to the current sector in that the phase current values may correspond to the phase current at substantially the time at which the rotor is in the current sector. In some embodiments, the phase fault detection system 402 receives the sector and phase current value from a component (e.g., current control system) associated with the motor control system. In some embodiments, the phase fault detection system 402 receives the sector data (e.g., comprising the current sector) from a SVPWM module of the current control system. In some embodiments, the phase fault detection system 402 receives the phase current data (e.g., data comprising the phase current values associated with each of the three phases with respect to the given sector) from a current sample/reconstruction module of the current control system. In this regard, in some embodiments, the phase fault detection system 402 may be configured to determine the peak phase channel 408 associated with a current sector based on sector data and phase current data received from one or more components (e.g., SVPWM module, current sample/reconstruction module) associated with the motor control system. In some embodiments, the phase fault detection system 402 may be configured to detect, for each sector, the corresponding peak phase channel 408.

In some embodiments, the current sector is determined based on stator energization angle 403. The stator energization angle may correspond to or may be otherwise determined based on the rotor position. The rotor position, for example, may have a feedback from a sensor or sensorless observer. In some embodiments, the phase current values associated with the three phases for a current sector is determined using a current sensor (e.g., current shunt) configured to sense and/or measure the current on the three-phases. Alternatively or additionally, in some embodiments, a current reconstruction technique may be leveraged to determine the phase current. In some embodiments, the phase fault detection system 402 may receive a stator energization angle from one or more components associated with the motor control system, and determine the corresponding sector based on the stator energization angle.

Figures 4C, 4D:
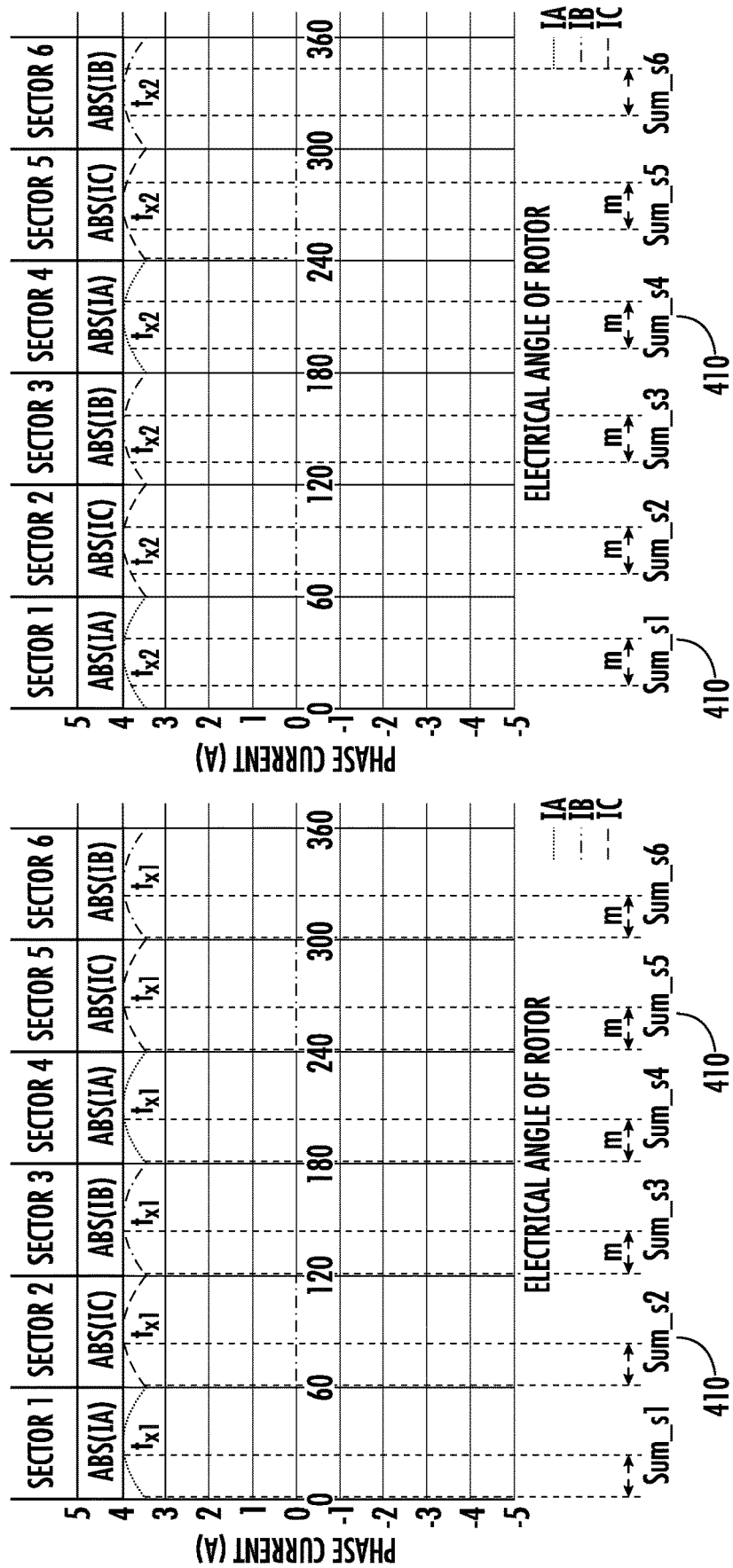
FIGS. 4c-d illustrate example sampling windows for determining peak phase channel current sum value in accordance with at least one example embodiment of the present disclosure.

In some embodiments, the phase fault detection system 402 determines a peak phase channel current sum value 410 for the current sector based on the peak current associated with the peak phase channel 408. In some embodiments, and as shown in FIGS. 4c-d, to determine the peak phase channel current sum value 410 for a given sector, the phase fault detection system 402 calculates the sum of consecutive numbers of peak values. The phase fault detection system 402 may determine the phase channel current sum value 410 (e.g., Sum_si) for each sector as illustrated in table 1 below.

TABLE 1

| Rotor Position | Sum | Calculation |
|---|---|---|
| Sector 1 | Sum_s1 | $\Sigma_{i=rx}^{m} ABS(IA_i)$, $\theta_{rx} \in (0°, 60°)$ |
| Sector 2 | Sum_s2 | $\Sigma_{i=rx}^{m} ABS(IC_i)$, $\theta_{rx} \in (60°, 120°)$ |

TABLE 1-continued

| Rotor Position | Sum | Calculation |
|---|---|---|
| Sector 3 | Sum_s3 | $\Sigma_{i-tx}^{m} ABS(IB_i)$, $\theta_{tx} \in (120°, 180°)$ |
| Sector 4 | Sum_s4 | $\Sigma_{i-tx}^{m} ABS(IA_j)$, $\theta_{tx} \in (180°, 240°)$ |
| Sector 5 | Sum_s5 | $\Sigma_{i-tx}^{m} ABS(IC_j)$, $\theta_{tx} \in (240°, 300°)$ |
| Sector 6 | Sum_s6 | $\Sigma_{i-tx}^{m} ABS(IB_j)$, $\theta_{tx} \in (300°, 360°)$ |

For example, when the motor is running at time t_x1, the phase fault detection system 402 determines the corresponding phase current of peak phase channels (e.g., peak states S1~S6) for each sector, calculates the absolute values of the phase current of the peak phase channels, and calculates the sum value of each last m consecutive sample in each sector based on the absolute peak phase channel current values (e.g., absolute peak current values), where m is the sampling window size for calculating the peak phase channel current sum value and/or for recording/storing the peak phase channel current sum value. As another example, when the motor is running at time t_x2, the system determines the corresponding phase current of peak phase channels (e.g., peak states S1~S6) for each sector, calculates the absolute values of the phase current of the peak phase current of the peak phase channels, and calculates the sum value of each last m consecutive sample in each sector based on the absolute peak phase channel current values (e.g., absolute peak current values). In this regard, the phase fault detection system 402 may be configured to move the last m consecutive sampling window to keep the window with the same related phase position from the start point of a different sector. In some embodiments, the sampling window size (m) may be configurable.

With reference to FIG. 4a, the phase fault detection system 402 stores the peak phase channel current sum value. In some embodiments, the phase fault detection system 402 stores the peak phase channel current sum values in a temporary storage location 412 (e.g., a buffer, and/or the like). For example, a buffer may be leveraged to store the last sector calculation/sum value (e.g., last peak phase channel current sum value), the current sector calculation/sum value (e.g., current peak phase channel current sum value), and/or the next period calculation/sum value. Alternatively or additionally, in some embodiments, the phase fault detection system 402 may persistently store the peak phase channel current sum values.

In some embodiments, for the current sector, the phase fault detection system 402 determines a difference measure (e.g., difference sum value) based on the peak phase channel current sum value for the current sector and the peak phase channel current sum value for the last sector (e.g., immediately preceding sector with respect to the current sector). In some embodiments, the phase fault detection system 402 determines the last sector associated with a current sector based on the direction of the motor rotation. For example, the phase fault detection system 402 may determine the current sector and last sector based on the direction of the motor rotation.

In some embodiments, the phase fault detection system 402 determines the difference measure (e.g., difference sum) for each sector as shown in table 2 below when the motor rotates in a clockwise direction and determines the difference sum for each sector as shown in table 3 below when the motor rotates in counter-clockwise direction.

TABLE 2

| Rotor Position | Last Position | Difference (Diff_Sn) | Degree of Unbalance |
|---|---|---|---|
| Sector1$_n$ | Sector6$_{n-1}$ | MAX(Sum_1$_n$, Sum_6$_{n-1}$) − MIN(Sum_1$_n$, Sum_6$_{n-1}$) | Diff_S$_1$ * 32768/ MAX(Sum_1$_n$, Sum_6$_{n-1}$) |
| Sector2$_n$ | Sector1$_n$ | MAX(Sum_1$_n$, Sum_2$_n$) − MIN(Sum_1$_n$, Sum_2$_n$) | Diff_S$_2$ * 32768/ MAX(Sum_1$_n$, Sum_2$_n$) |
| Sector3$_n$ | Sector2$_n$ | MAX(Sum_2$_n$, Sum_3$_n$) − MIN(Sum_2$_n$, Sum_3$_n$) | Diff_S$_3$ * 32768/ MAX(Sum_2$_n$, Sum_3$_n$) |
| Sector4$_n$ | Sector3$_n$ | MAX(Sum_3$_n$, Sum_4$_n$) − MIN(Sum_3$_n$, Sum_4$_n$) | Diff_S$_4$ * 32768/ MAX(Sum_3$_n$, Sum_4$_n$) |
| Sector5$_n$ | Sector4$_n$ | MAX(Sum_4$_n$, Sum_5$_n$) − MIN(Sum_4$_n$, Sum_5$_n$) | Diff_S$_5$ * 32768/ MAX(Sum_4$_n$, Sum_5$_n$) |
| Sector6$_n$ | Sector5$_n$ | MAX(Sum_5$_n$, Sum_6$_n$) − MIN(Sum_5$_n$, Sum_6$_n$) | Diff_S$_6$ * 32768/ MAX(Sum_5$_n$, Sum_6$_n$) |

TABLE 3

| Rotor Position | Last Position | Difference (Diff_Sn) | Degree of Unbalance |
|---|---|---|---|
| Sector1$_n$ | Sector2$_n$ | MAX(Sum_1$_n$, Sum_2$_n$) − MIN(Sum_1$_n$, Sum_2$_n$) | Diff_S$_1$ * 32768/ MAX(Sum_1$_n$, Sum_2$_n$) |
| Sector2$_n$ | Sector3$_n$ | MAX(Sum_2$_n$, Sum_3$_n$) − MIN(Sum_2$_n$, Sum_3$_n$) | Diff_S$_2$ * 32768/ MAX(Sum_2$_n$, Sum_3$_n$) |
| Sector3$_n$ | Sector4$_n$ | MAX(Sum_3$_n$, Sum_4$_n$) − MIN(Sum_3$_n$, Sum_4$_n$) | Diff_S$_3$ * 32768/ MAX(Sum_3$_n$, Sum_4$_n$) |
| Sector4$_n$ | Sector5$_n$ | MAX(Sum_4$_n$, Sum_5$_n$) − MIN(Sum_4$_n$, Sum_5$_n$) | Diff_S$_4$ * 32768/ MAX(Sum_4$_n$, Sum_5$_n$) |
| Sector5$_n$ | Sector6$_n$ | MAX(Sum_5$_n$, Sum_6$_n$) − MIN(Sum_5$_n$, Sum_6$_n$) | Diff_S$_5$ * 32768/ MAX(Sum_5$_n$, Sum_6$_n$) |
| Sector6$_n$ | Sector1$_{n-1}$ | MAX(Sum_6$_n$, Sum_1$_{n-1}$) − MIN(Sum_6$_n$, Sum_1$_{n-1}$) | Diff_S$_6$ * 32768/ MAX(Sum_6$_n$, Sum_1$_{n-1}$) |

In some embodiments, and as shown in tables 2 and 3 above, the phase fault detection system 402 normalizes the difference sum to dimensionless value (e.g., Q15 format) to determine the degree of unbalance 416 (e.g., degree of unbalance on phase current) with respect to the current sector.

With reference to FIG. 4a, in some embodiments, the phase fault detection system 402 determines whether the degree of unbalance satisfies a degree of unbalance threshold. For example, the phase fault detection system 402 compares the degree of unbalance to a degree of unbalance threshold 418 to determine if the degree of unbalance exceeds the degree of unbalance threshold. In some embodiments, the degree of unbalance is compared to the degree of unbalance threshold in real-time. In some embodiments, the degree of unbalance threshold is determined based on the maximum tolerable conditions of the driving system (e.g., motor control system). The degree of unbalance threshold may be a constant value and/or configurable. The degree of unbalance threshold may be configured for triggering or otherwise informing a microcontroller associated with the motor control system that the motor has experienced unbalance phase, phase loss fault, and/or damage.

In some embodiments, the phase fault detection system 402 updates a phase unbalance occurrence count 420. In some embodiments, a phase unbalance occurrence count describes the number of consecutive degree of unbalance that satisfies the degree of unbalance threshold. In some embodiments, the phase fault detection system 402 increases the phase unbalance occurrence count in response to determining that the degree of unbalance satisfies the degree of unbalance threshold. In some embodiments, the phase fault detection system 402 resets the phase unbalance occurrence count in response to determining that the degree of unbalance fails to satisfy the degree of unbalance threshold.

In some embodiments, the phase fault detection system 402 compares the phase unbalance occurrence count 420 to an anti-jitter time threshold 422. The anti-jitter time threshold 422, for example, may be a predetermined threshold. For example, an anti-jitter time threshold may be leveraged for determining when to remove the jitter in the phase current (e.g., when the degree of unbalance (e.g., unbalance measurement) satisfies the degree of unbalance threshold for at least a predetermined consecutive time. For example, the anti-jitter time threshold may correspond to consecutive times of judgment, where the jitter is removed if the degree of unbalance satisfies the degree of unbalance threshold for at least the anti-jitter time threshold. In some embodiments, comparing the phase unbalance occurrence count to an anti-jitter time threshold provide for strong anti-interference ability for fault judgement, including ripples on the phase current sampling.

FIG. 4e illustrates an operational example of unbalanced phase current waveform that may be associated with a motor in accordance with at least one example embodiment of the present disclosure. FIG. 4f illustrates an operational example of a graphical representation of the degree of unbalance output of an example phase fault detection system in accordance with at least one example embodiment of the present disclosure. Specifically FIG. 4f illustrates a degree of unbalance output of an example phase fault detection system corresponding to the unbalance phase current waveform illustrated in FIG. 4e. As shown in FIG. 4e, the unbalanced phase current waveform depicts a phase current waveform 440a, 440c, and 440c, each corresponding to a particular phase of the three-phase motor. As shown in FIG. 4f, the degree of unbalance 416 on phase current with respect to the three-phase motor is compared to a degree of unbalance threshold 418 to determine a phase unbalance occurrence count 420 (e.g., corresponding to anti-jitter time), which, in turn, is compared to an anti-titter time threshold.

Figure 4G:
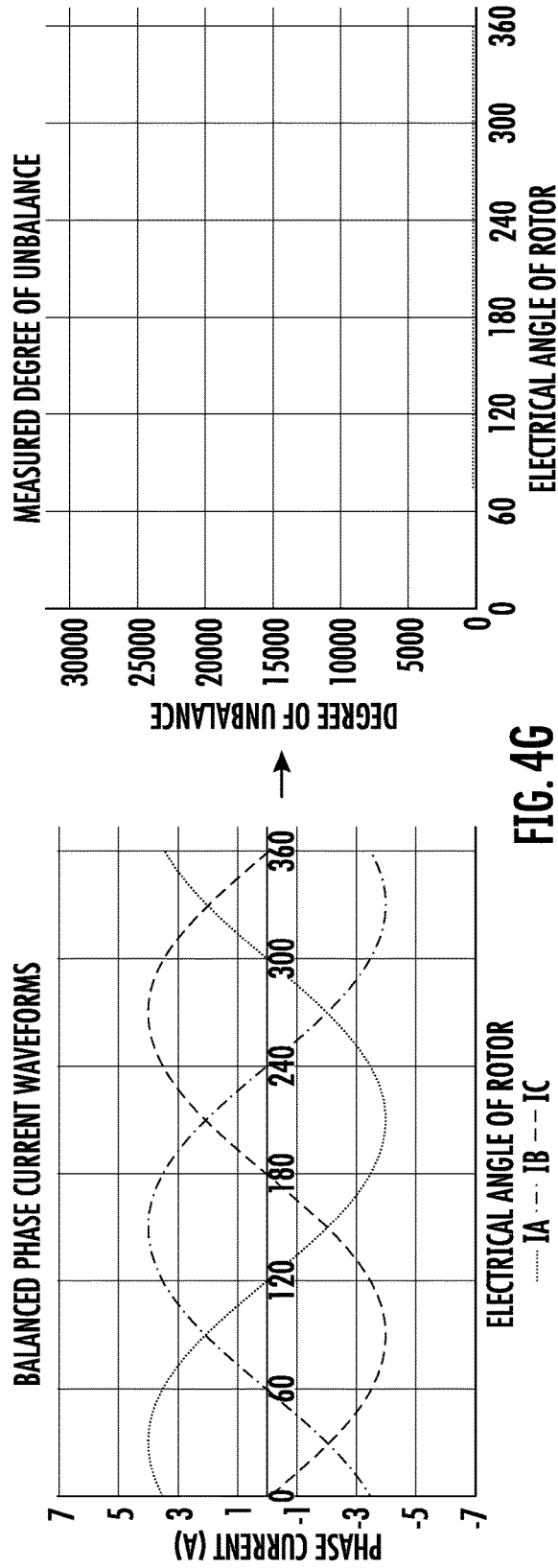
Figure 4H:
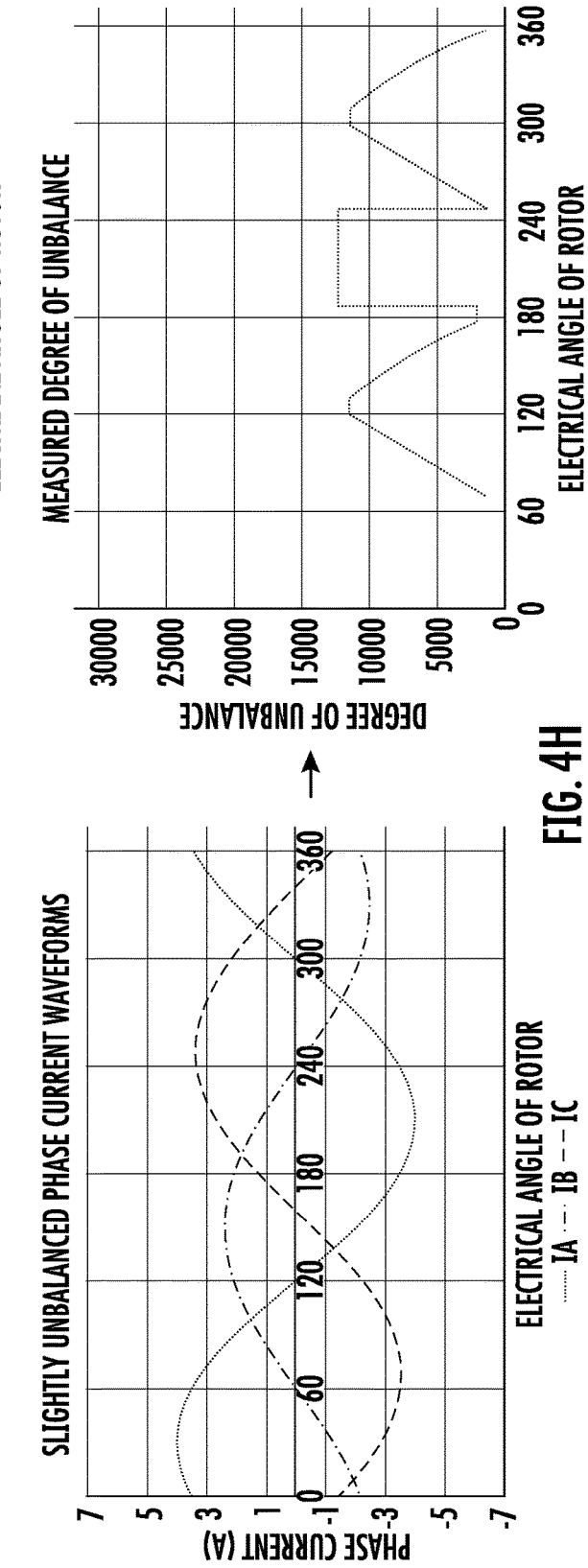
Figure 4K:
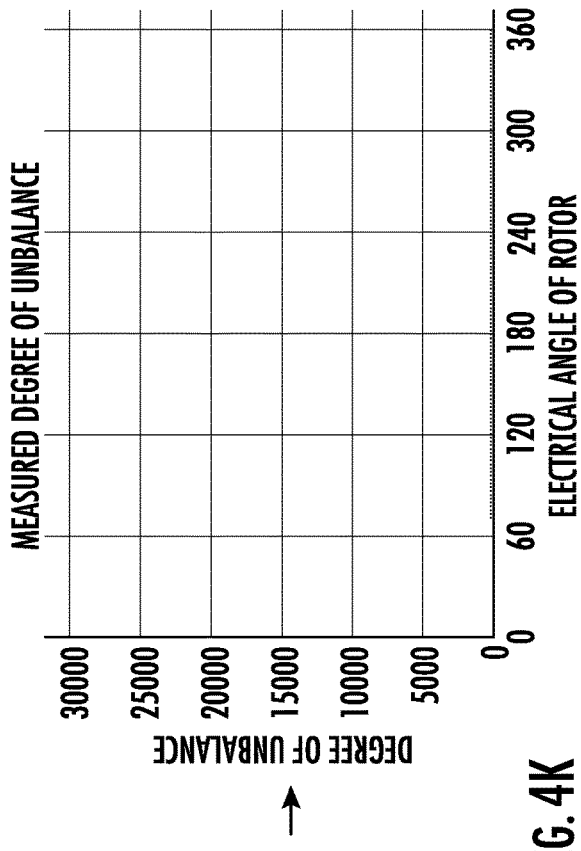
Figure 4K:
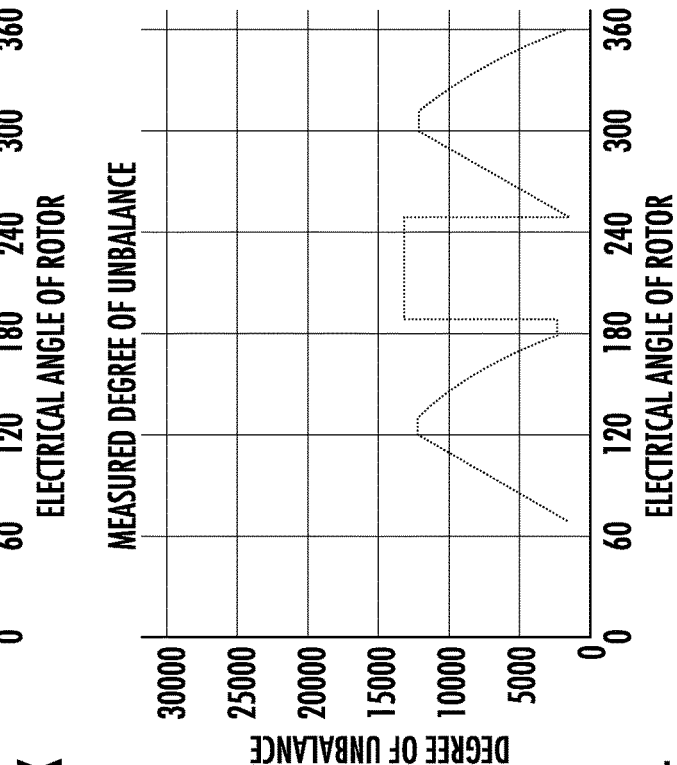
Figure 4L:
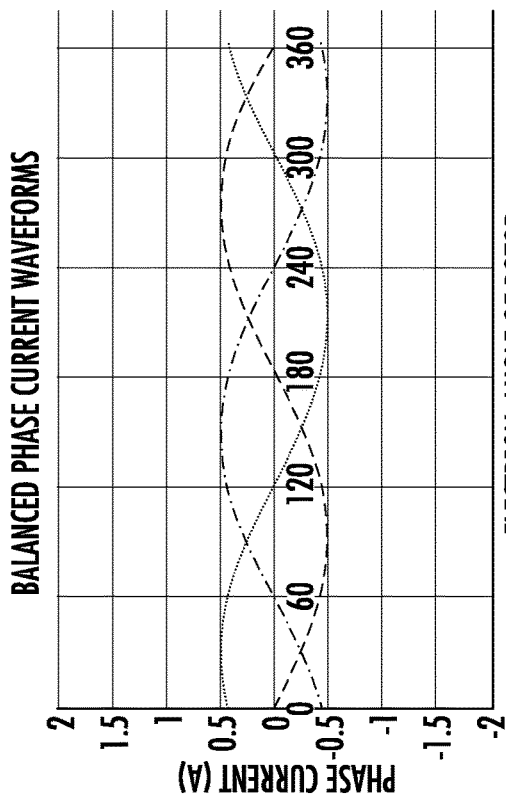
Figure 4L:
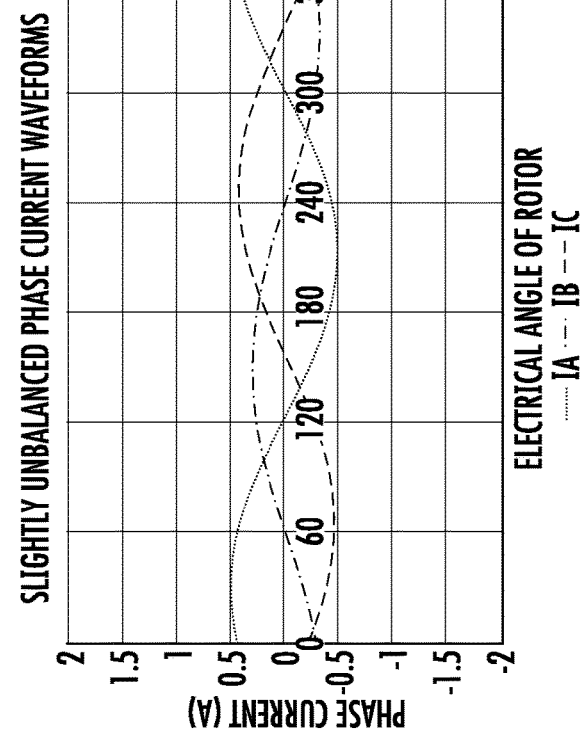
Figure 4M:
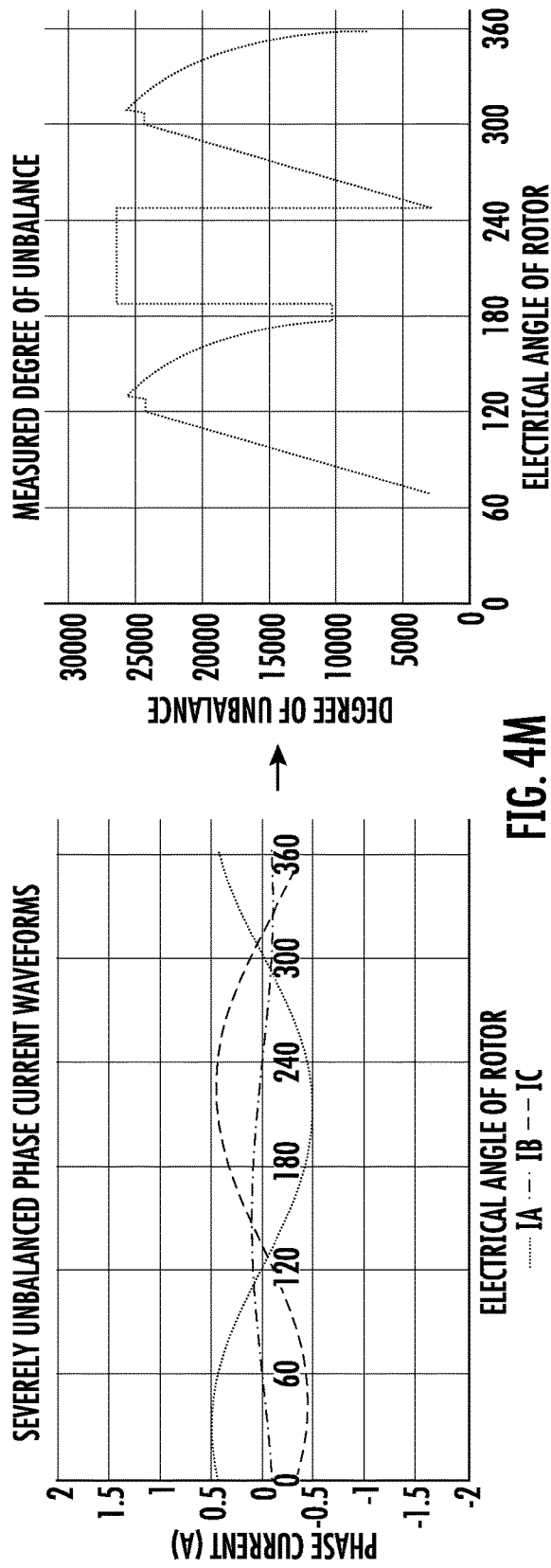
Figure 4N:
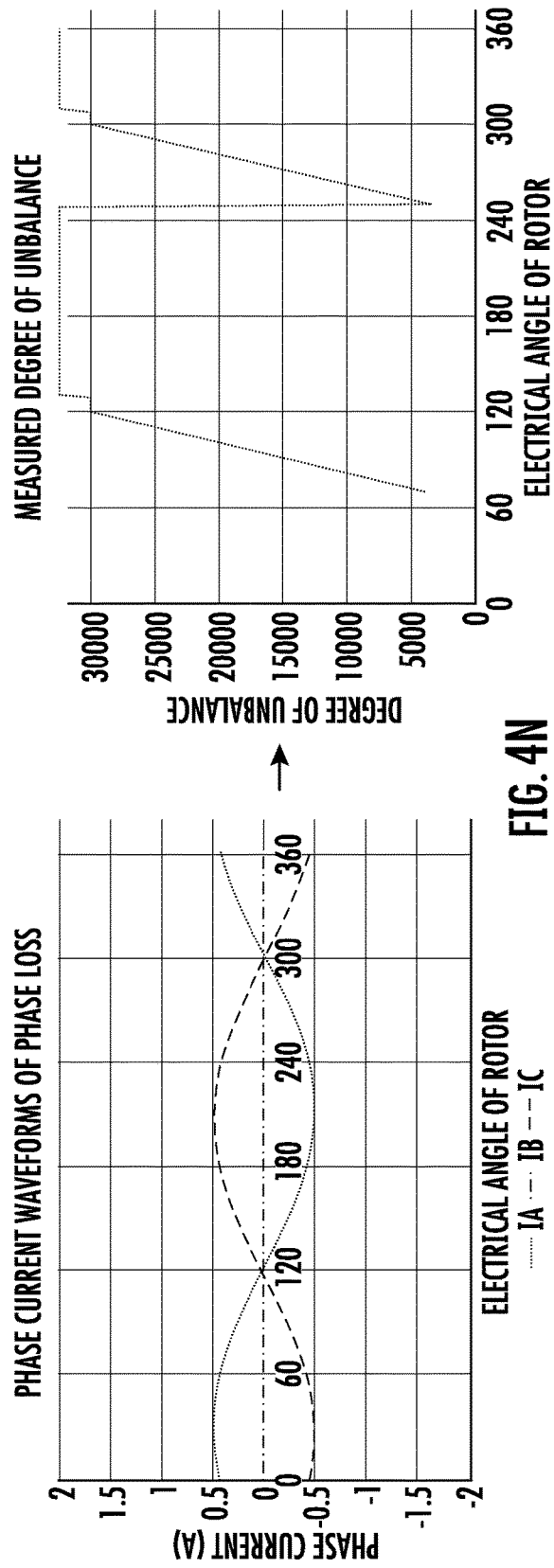

FIGS. 4g-j illustrate operational examples of varying degrees of phase current waveform and corresponding degree of unbalance output in accordance with at least one example embodiment of the present disclosure. Specifically FIGS. 4g-h illustrate operational examples of varying degrees of phase current waveform and corresponding degree of unbalance output at rated power working condition (e.g., 4 Amperes Peak). FIGS. 4k-n illustrate operational examples of varying degrees of phase current waveform and corresponding degree of unbalance output in accordance with at least one example embodiment of the present disclosure. Specifically FIGS. 4k-n illustrate operational examples of varying degrees of phase current waveform and corresponding degree of unbalance output at no-load working condition (e.g., 0.5 Amperes Peak).

As shown in FIG. 4g-n, embodiments of the present disclosure perform effectively both on rated power state and no-load state, which obviates the need to set different threshold for fault triggering according to different peak phase current in the driving system/motor control system. For instance, example, embodiments of the present disclosure are configured to work in both load working condition (e.g., rated power working condition) and no-load working condition, where the same performance can be shown for the rated power working condition and no-load working condition regardless of the current level.

In some embodiments, the phase fault detection system 402 initiates one or more protection actions 424 in response to a phase unbalance occurrence count that satisfies the anti-jitter time threshold to mitigate damage. In some embodiments, non-limiting examples of a protection action include decreasing the speed of the motor, causing a microcontroller associated with the motor to stop the motor, and/or the like.

Having described example systems and apparatuses, and data visualizations, in accordance with the disclosure, example processes of the disclosure will now be discussed. It will be appreciated that each of the flowcharts depicts an example computer-implemented process that is performable by one or more of the apparatuses, systems, devices, and/or computer program products described herein, for example utilizing one or more of the specially configured components thereof.

Although the example processes depict a particular sequence of operations, the sequence may be altered without departing from the scope of the present disclosure. For example, some of the operations depicted may be performed in parallel or in a different sequence that does not materially affect the function of the processes.

The blocks indicate operations of each process. Such operations may be performed in any of a number of ways, including, without limitation, in the order and manner as depicted and described herein. In some embodiments, one or more blocks of any of the processes described herein occur in-between one or more blocks of another process, before one or more blocks of another process, in parallel with one or more blocks of another process, and/or as a sub-process of a second process. Additionally or alternatively, any of the processes in various embodiments include some or all operational steps described and/or depicted, including one or more optional blocks in some embodiments. With regard to the flowcharts illustrated herein, one or more of the depicted block(s) in some embodiments is/are optional in some, or all, embodiments of the disclosure. Optional blocks are depicted with broken (or "dashed") lines. Similarly, it should be appreciated that one or more of the operations of each flowchart may be combinable, replaceable, and/or otherwise altered as described herein.

Figure 5:
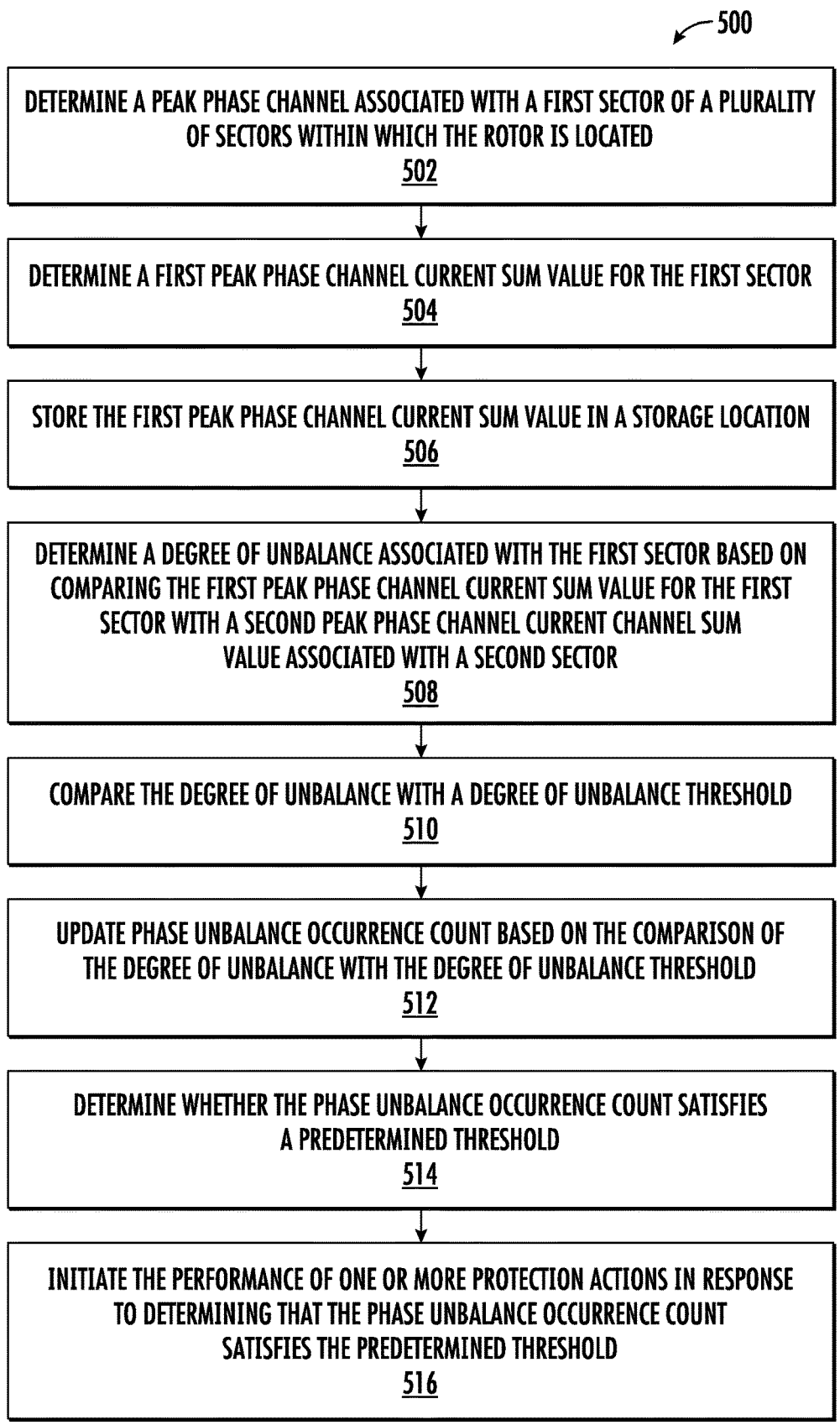
FIG. 5 illustrates a flow chart depicting example operations of an example process for detecting phase fault in accordance with at least one example embodiment of the present disclosure.

FIG. 5 illustrates a flow chart depicting example operations of an example process for detecting phase fault in accordance with at least one example embodiment of the present disclosure. Specifically, FIG. 5 depicts an example process 500 for detecting at least unbalance phase and/or phase loss fault associated with a motor. In some embodiments, the process 500 is embodied by computer program code stored on a non-transitory computer-readable storage medium of a computer program product configured for execution to perform the process as depicted and described. Alternatively or additionally, in some embodiments, the process 500 is performed by one or more specially-configured computing devices, such as the apparatus 300 alone or in communication with one or more other component(s), device(s), system(s), and/or the like. In this regard, in some such embodiments, the apparatus 300 is specially-configured by computer-coded instructions (e.g., computer program instructions) stored thereon, for example in the memory 304 and/or another component depicted and/or described herein and/or otherwise accessible to the apparatus 300, for performing the operations as depicted and described. In some embodiments, the apparatus 300 is in communication with one or more external apparatus(es), system(s), device(s), and/or the like, to perform one or more of the operations as depicted and described. For example, the apparatus 300 in some embodiments is in communication with at least one external data repository, client system, and/or the like, to perform one or more of the operations as depicted and described. For purposes of simplifying the description, the process 500 is described as performed by and from the perspective of the apparatus 300.

Although the example process 500 depicts a particular sequence of operations, the sequence may be altered without departing from the scope of the present disclosure. For example, some of the operations depicted may be performed in parallel or in a different sequence that does not materially affect the function of the process 500. In other examples, different components of an example device or system that implements the process 500 may perform functions at substantially the same time or in a specific sequence.

According to some examples, the method includes determining, a peak phase channel associated with a first sector of a plurality of sectors within which the rotor is located at block 502. In some embodiments, the apparatus 300 embodying the phase fault detection system determines the peak phase channel associated with the first sector based on stator energization vector associated with the motor. In some embodiments, the motor comprises a three-phase motor. The first sector may correspond to a current sector within which the rotor is located. In some embodiments, the apparatus 300 detects the first sector based on stator energization angle.

In some embodiments, the apparatus 300 receives the current sector data (e.g., first sector) and phase currents associated with each phase of the three-phase motor. The apparatus 300 then determines the peak phase channel based on the current sector data and the phase currents associated with each phase of the three-phase motor.

According to some examples, the method includes determining, a first peak phase channel current sum value for the first sector at block 504. In some embodiments, the apparatus 300 determines the peak phase channel current sum value based on performing a calculation operation that comprises calculating a sum value of consecutive numbers of peak current values associated with the peak phase channel. For example, the apparatus 300 may perform a calculation operation in accordance with table 1 above.

According to some examples, the method includes storing the first peak phase channel current sum value in a storage location at block 506. In some embodiments, the apparatus 300 stores the first peak phase channel current sum value in a temporary storage location (e.g., buffer, and/or the like) for comparison with a peak phase channel current sum value associated with a subsequent sector of the plurality of sectors.

According to some examples, the method includes determining a degree of unbalance associated with the first sector at block 508. In some embodiments, the apparatus 300 determines the degree of unbalance associated with the first sector based on comparing the first peak phase channel current sum value for the first sector with a second peak phase channel current sum value associated with a second sector of the plurality of sectors, where the second sector comprise a previous sector with respect to the first sector. As described above, the first sector may comprise the current sector which the rotor is located. In some embodiments, the apparatus 300 determines the current sector and/or the second sector based on the direction of rotation of the rotor.

In some embodiments, to determine the degree of unbalance associated with the first sector, the apparatus 300 determines a difference measure for the first sector based on the first peak phase channel current sum value for the first sector and the second peak phase channel current sum value associated with a second sector of the plurality of sectors. For example, the apparatus 300 performs a calculation operation that comprises calculating the difference between the peak phase current sum value for the first sector and the second peak phase channel current sum value associated with a second sector in accordance with table 2. The apparatus 300 then performs a calculation operation that comprises normalizing the difference sum. For example, the apparatus 300 may perform a normalization operation on the difference measure to determine the degree of unbalance associated with the first sector. In some embodiments, the normalization operation may enable example, embodiments of the present disclosure to work in both load working condition (e.g., rated power working condition) and no-load working condition (e.g., 0.5A peak, and/or the like), where the same performance can be shown for the rated power working condition and no-load working condition regardless of the current level.

According to some examples, the method includes comparing the degree of unbalance with the degree of unbalance threshold to determine whether the degree of unbalance associated with the first sector satisfies a degree of unbalance threshold at block 510. For example, the apparatus 300 may determine whether the degree of unbalance associated with the first sector satisfies the degree of unbalance threshold by comparing the degree of unbalance associated with the first sector with the degree of unbalance threshold.

According to some examples, the method includes updating a phase unbalance occurrence count for the motor at block 512. In some embodiments, a phase unbalance occurrence count describes the number of consecutive degree of unbalance that satisfies the degree of unbalance threshold. In some embodiments, the apparatus 300 updates the phase unbalance occurrence count for the motor based on the comparison of the degree of unbalance with the degree of unbalance threshold. In some embodiments, the apparatus 300 updates the phase unbalance occurrence count by increasing the phase unbalance occurrence count by a predefined amount (e.g. 1, 2, and/or the like) in response to determining that the degree of unbalance satisfies the degree of unbalance threshold. In some embodiments, the apparatus 300 resets the phase unbalance occurrence count (e.g., to a predefined amount, for example, zero) in response to determining that the degree of unbalance fails to satisfy the degree of unbalance threshold.

According to some examples, the method includes determining whether the phase unbalance occurrence count satisfies a predetermined threshold at block 514. In some embodiments, the predetermined threshold may describe an anti-jitter time threshold. For example, in some embodiments, the apparatus 300 may determine whether the phase unbalance occurrence count satisfies anti-jitter time threshold, where the anti-jitter time threshold is configured for determining when the degree of unbalance associated with an electrical period of the motor satisfies the degree of unbalance threshold for at least a predetermined consecutive time. In some embodiments, the apparatus determines that the motor is associated with a phase unbalance (e.g., one or more phases) and/or phase loss fault in response to determining that the phase unbalance occurrence count satisfies the predetermined threshold;

According to some example, the method includes initiating the performance of one or more protection actions in response to determining that the phase unbalance occurrence count satisfies the predetermined threshold (e.g., anti-jitter time threshold) at block 516.

CONCLUSION

Many modifications and other embodiments of the disclosure set forth herein will come to mind to one skilled in the art to which this disclosure pertains having the benefit of the teachings presented in the foregoing description and the associated drawings. Therefore, it is to be understood that the embodiments are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

While this specification contains many specific implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

Further, while this detailed description has set forth some embodiments of the present disclosure, the appended claims may cover other embodiments of the present disclosure which differ from the described embodiments according to various modifications and improvements. For example, while the description above provides an example PMSM driving system for a three-phase motor, it is noted that the scope of the present disclosure is not limited to the description above. Example embodiments of the present disclosure may be implemented in other driving systems, and/or other motor configurations. For example, while the description herein is made with reference to three-phase motor, it will be understood that the techniques disclose herein are more generally applicable to multi-phase motors.

Further, within the appended claims, unless the specific terms "means for" or "step for" is used within a given claim, it is not intended that the claim be interpreted under 35 U.S.C. § 112, paragraph (f).

The invention claimed is:

1. A computer-implemented method for detecting phase fault in a motor comprising a stator and a rotor, the computer-implemented method comprising:
   determining, by one or more processors and based on stator energization vector, a peak phase channel associated with a first sector of a plurality of sectors within which the rotor is located;
   determining, by the one or more processors, a first peak phase channel current sum value for the first sector, wherein the first peak phase channel current sum value comprises a sum value of consecutive numbers of peak current values associated with the peak phase channel;
   determining, by the one or more processors, a degree of unbalance associated with the first sector based on comparing the first peak phase channel current sum value for the first sector with a second peak phase channel current sum value associated with a second sector of the plurality of sectors, wherein the first sector comprises a current sector and the second sector comprises a previous sector determined based on a direction of rotation of the rotor;
   comparing, by the one or more processors, the degree of unbalance with a degree of unbalance threshold to determine whether the degree of unbalance satisfies the degree of unbalance threshold; and
   updating, by the one or more processors, a phase unbalance occurrence count for the motor based on comparison of the degree of unbalance with the degree of unbalance threshold.

2. The computer-implemented method of claim 1, wherein determining the degree of unbalance associated with the first sector comprises:
   determining, by the one or more processors, a difference measure for the first sector based on the first peak phase channel current sum value for the first sector and the second peak phase channel current sum value associated with the second sector of the plurality of sectors; and
   performing a normalization operation on the difference measure to determine the degree of unbalance.

3. The computer-implemented method of claim 1, further comprising:
   determining whether the phase unbalance occurrence count satisfies a predetermined threshold; and
   initiating the performance of one or more protection actions in response to determining that the phase unbalance occurrence count satisfies the predetermined threshold.

4. The computer-implemented method of claim 3, further comprising:
   determining that the motor is associated with an unbalance phase and/or phase loss fault in response to determining that the phase unbalance occurrence count satisfies the predetermined threshold.

5. The computer-implemented method of claim 1, wherein the motor comprises a three-phase motor.

6. The computer-implemented method of claim 1, further comprising:
   determining the first sector based on stator energization angle.

7. The computer-implemented method of claim 1, further comprising:
   storing the first peak phase channel current sum value in a storage location for comparison with a third peak phase channel current sum value associated with a subsequent sector.

8. An apparatus for detecting phase fault in a motor comprising a stator and a rotor, the apparatus comprising at least one processor and at least one non-transitory memory comprising program code stored thereon, wherein the at least one non-transitory memory and the program code are configured to, with the at least one processor, cause the apparatus to at least:
   determine based on stator energization vector, a peak phase channel associated with a first sector of a plurality of sectors within which the rotor is located;
   determine a first peak phase channel current sum value for the first sector, wherein the first peak phase channel current sum value comprises a sum value of consecutive numbers of peak current values associated with the peak phase channel;
   determine a degree of unbalance associated with the first sector based on comparing the first peak phase channel current sum value for the first sector with a second peak phase channel current sum value associated with a second sector of the plurality of sectors, wherein the first sector comprises a current sector and the second sector comprises a previous sector determined based on a direction of rotation of the rotor;
   compare the degree of unbalance with a degree of unbalance threshold to determine whether the degree of unbalance satisfies the degree of unbalance threshold; and
   update a phase unbalance occurrence count for the motor based on comparison of the degree of unbalance with the degree of unbalance threshold.

9. The apparatus of claim 8, wherein the at least one non-transitory memory and the program code are configured to, with the at least one processor, cause the apparatus to determine the degree of unbalance associated with the first sector by:
   determining a difference measure for the first sector based on the first peak phase channel current sum value for the first sector and the second peak phase channel current sum value associated with the second sector of the plurality of sectors; and
   performing a normalization operation on the difference measure to determine the degree of unbalance.

10. The apparatus of claim 8, wherein the at least one non-transitory memory and the program code are configured to, with the at least one processor, further cause the apparatus to at least:
    determine whether the phase unbalance occurrence count satisfies a predetermined threshold; and
    initiate the performance of one or more protection actions in response to determining that the phase unbalance occurrence count satisfies the predetermined threshold.

11. The apparatus of claim 10, wherein the at least one non-transitory memory and the program code are configured to, with the at least one processor, further cause the apparatus to at least:
    determine that the motor is associated with an unbalance phase and/or phase loss fault in response to determining that the phase unbalance occurrence count satisfies the predetermined threshold.

12. The apparatus of claim 8, wherein the motor comprises a three-phase motor.

13. The apparatus of claim 8, wherein the at least one non-transitory memory and the program code are configured to, with the at least one processor, further cause the apparatus to at least:
    determine the first sector based on stator energization angle.

14. The apparatus of claim 8, wherein the at least one non-transitory memory and the program code are configured to, with the at least one processor, further cause the apparatus to at least:
    storing the first peak phase channel current sum value in a storage location for comparison with a third peak phase channel current sum value associated with a subsequent sector.

15. A computer program product for detecting phase fault in a motor comprising a stator and a rotor, the computer program product comprising at least one non-transitory computer-readable storage medium having computer-readable program code portions stored therein, the computer-readable program code portions comprising an executable portion configured to:
    determine based on stator energization vector, a peak phase channel associated with a first sector of a plurality of sectors within which the rotor is located;
    determine a first peak phase channel current sum value for the first sector, wherein the first peak phase channel current sum value comprises a sum value of consecutive numbers of peak current values associated with the peak phase channel;
    determine a degree of unbalance associated with the first sector based on comparing the first peak phase channel current sum value for the first sector with a second peak phase channel current sum value associated with a second sector of the plurality of sectors, wherein the first sector comprises a current sector and the second sector comprises a previous sector determined based on a direction of rotation of the rotor;
    compare the degree of unbalance with a degree of unbalance threshold to determine whether the degree of unbalance satisfies the degree of unbalance threshold; and
    update a phase unbalance occurrence count for the motor based on comparison of the degree of unbalance with the degree of unbalance threshold.

16. The computer program product of claim 15, wherein the executable portion is further configured to determine the degree of unbalance associated with the first sector by:
    determining a difference measure for the first sector based on the first peak phase channel current sum value for the first sector and the second peak phase channel current sum value associated with the second sector of the plurality of sectors; and
    performing a normalization operation on the difference measure to determine the degree of unbalance.

17. The computer program product of claim 15, wherein the executable portion is further configured to:
    determine whether the phase unbalance occurrence count satisfies a predetermined threshold; and
    initiate the performance of one or more protection actions in response to determining that the phase unbalance occurrence count satisfies the predetermined threshold.

18. The computer program product of claim 17, wherein the executable portion is further configured to:
    determine that the motor is associated with an unbalance phase and/or phase loss fault in response to determining that the phase unbalance occurrence count satisfies the predetermined threshold.

19. The computer program product of claim 15, wherein the motor comprises a three-phase motor.

20. The computer program product of claim 15, wherein the executable portion is further configured to:
    determine the first sector based on stator energization angle.

* * * * *